United States Patent
Pherson et al.

(10) Patent No.: US 10,773,881 B2
(45) Date of Patent: Sep. 15, 2020

(54) AIR CARGO CONTAINER AND CURTAIN FOR THE SAME

(71) Applicant: Advanced Composite Structures, LLC, Charleston, SC (US)

(72) Inventors: Thomas R. Pherson, Daniel Island, SC (US); Garry L. Haruska, Goose Creek, SC (US)

(73) Assignee: Advanced Composite Structures, LLC, Charleston, SC (US)

( * ) Notice: Subject to any disclaimer, the term of this patent is extended or adjusted under 35 U.S.C. 154(b) by 573 days.

(21) Appl. No.: 14/874,957

(22) Filed: Oct. 5, 2015

(65) Prior Publication Data

US 2017/0096295 A1    Apr. 6, 2017

(51) Int. Cl.
| | |
|---|---|
| B65D 90/06 | (2006.01) |
| B65D 90/02 | (2019.01) |
| B65D 90/22 | (2006.01) |
| B64D 9/00 | (2006.01) |
| B65D 81/38 | (2006.01) |
| B65D 88/14 | (2006.01) |
| E06B 5/00 | (2006.01) |

(52) U.S. Cl.
CPC ............ *B65D 90/021* (2013.01); *B64D 9/00* (2013.01); *B65D 81/3816* (2013.01); *B65D 88/14* (2013.01); *B65D 90/022* (2013.01); *B65D 90/22* (2013.01); *E06B 5/00* (2013.01); *B65D 2211/00* (2013.01)

(58) Field of Classification Search
CPC .... E06B 9/02; E06B 5/00; B64D 9/00; B64D 90/021; B65D 81/3816; B65D 88/14
USPC ........................................ 296/186.2; 160/40
See application file for complete search history.

(56) References Cited

U.S. PATENT DOCUMENTS

| | | | | |
|---|---|---|---|---|
| 1,557,382 A | * | 10/1925 | Sundback | A44B 19/301 135/119 |
| 2,495,636 A | * | 1/1950 | Hoeltzel | E04B 1/88 156/216 |
| 3,160,307 A | * | 12/1964 | Morrison | B65D 11/1873 165/135 |
| 3,161,258 A | * | 12/1964 | Chapman | E04B 1/8409 139/425 R |
| 3,165,760 A | * | 1/1965 | Abajian | A47D 7/002 5/97 |

(Continued)

FOREIGN PATENT DOCUMENTS

| | | |
|---|---|---|
| DE | 3004699 | 8/1980 |
| DE | 4441842 | 6/1995 |

(Continued)

OTHER PUBLICATIONS

Takai, English Translation of "JP 2004-2033395" obtained from <http://ep.espacenet.com/>. (Year: 2004).*

(Continued)

*Primary Examiner* — Johnnie A. Shablack
(74) *Attorney, Agent, or Firm* — Womble Bond Dickinson (US) LLP

(57) ABSTRACT

A curtain closure for the cargo opening of an air cargo container and the air cargo containers that have the same. The curtain closures include a fabric layer, and at least one of an insulating layer or a reinforcing layer attached to the inside of the fabric layer.

19 Claims, 15 Drawing Sheets

(56) References Cited

U.S. PATENT DOCUMENTS

| | | | | |
|---|---|---|---|---|
| 3,251,399 A | * | 5/1966 | Grossman | E06B 3/285 160/180 |
| 3,372,729 A | * | 3/1968 | Lindenmayer | A47H 23/10 160/330 |
| 3,556,448 A | * | 1/1971 | Dobbs | B29C 70/24 206/597 |
| 3,558,423 A | * | 1/1971 | Rossetti | H01B 3/084 156/308.2 |
| 3,586,013 A | * | 6/1971 | Gladden | E04H 15/32 135/116 |
| 3,591,034 A | * | 7/1971 | Lohr | B65D 90/021 160/243 |
| 3,616,838 A | * | 11/1971 | Barr | E06B 7/26 160/368.1 |
| 3,657,042 A | * | 4/1972 | Rerolle | B31C 1/00 156/190 |
| 3,671,542 A | * | 6/1972 | Kwolek | C08J 3/02 152/556 |
| 3,709,552 A | * | 1/1973 | Broadbent | B60J 5/065 160/330 |
| 3,723,234 A | * | 3/1973 | MacDonald | B32B 27/00 138/109 |
| 3,785,694 A | * | 1/1974 | Sargent | B60J 7/102 296/98 |
| 3,856,072 A | * | 12/1974 | Sund | B60P 3/20 160/238 |
| 3,951,284 A | * | 4/1976 | Fell | B60P 3/00 141/10 |
| 4,046,186 A | * | 9/1977 | Nordstrom | B60P 7/04 160/368.1 |
| 4,131,150 A | * | 12/1978 | Papadakis | E06B 3/285 160/368.1 |
| 4,137,394 A | * | 1/1979 | Meihuizen | D01F 6/04 117/23 |
| 4,212,406 A | * | 7/1980 | Mittelmann | B65D 88/14 220/1.5 |
| 4,221,256 A | * | 9/1980 | Karaki | A44B 19/26 160/368.1 |
| 4,284,119 A | * | 8/1981 | Martin | E06B 3/485 160/229.1 |
| 4,304,824 A | * | 12/1981 | Karpinski | B32B 5/30 428/157 |
| 4,335,774 A | * | 6/1982 | Price | E06B 9/24 160/329 |
| 4,356,138 A | * | 10/1982 | Kavesh | D01F 6/04 264/164 |
| 4,391,865 A | * | 7/1983 | Constance | A47H 21/00 160/330 |
| 4,406,318 A | * | 9/1983 | Cukierski | A47H 13/14 160/126 |
| 4,413,110 A | * | 11/1983 | Kavesh | D01F 6/02 264/164 |
| 4,424,253 A | * | 1/1984 | Anderson | B32B 25/08 156/308.2 |
| 4,429,730 A | * | 2/1984 | Elston | B65D 88/125 160/368.1 |
| 4,440,711 A | * | 4/1984 | Kwon | D01F 6/14 264/185 |
| 4,457,985 A | * | 7/1984 | Harpell | A42B 3/062 428/911 |
| 4,493,870 A | * | 1/1985 | Vrouenraets | A41D 31/02 428/419 |
| 4,535,027 A | * | 8/1985 | Kobashi | D01D 5/12 264/210.7 |
| 4,538,663 A | * | 9/1985 | Looker | B65D 88/14 160/368.1 |
| 4,545,611 A | * | 10/1985 | Broadbent | B60J 5/065 160/186 |
| 4,557,961 A | * | 12/1985 | Gorges | B32B 3/12 428/117 |
| 4,597,818 A | * | 7/1986 | Aoyama | B32B 27/32 156/308.2 |
| 4,599,267 A | * | 7/1986 | Kwon | D01F 6/14 264/282 |
| 4,600,235 A | * | 7/1986 | Frederick | B60J 5/108 160/290.1 |
| 4,601,405 A | * | 7/1986 | Riemer | B64D 9/00 160/368.1 |
| 4,738,371 A | * | 4/1988 | Wakeman | B65D 19/06 217/43 A |
| 4,780,351 A | * | 10/1988 | Czempoyesh | B32B 5/26 428/102 |
| 4,795,047 A | * | 1/1989 | Dunwoodie | B65D 88/14 220/1.5 |
| 4,802,233 A | * | 1/1989 | Skamser | A47J 47/145 206/545 |
| 4,852,316 A | * | 8/1989 | Webb | E04B 2/90 52/235 |
| 4,863,779 A | * | 9/1989 | Daponte | B32B 7/14 428/152 |
| 4,874,648 A | * | 10/1989 | Hill | B29C 44/5636 138/110 |
| 4,876,774 A | * | 10/1989 | Kavesh | D06C 7/02 139/420 R |
| 4,894,281 A | * | 1/1990 | Yagi | B29C 70/04 428/298.7 |
| 4,895,878 A | * | 1/1990 | Jourquin | C08G 18/3829 521/103 |
| 4,911,317 A | * | 3/1990 | Schloesser | B65D 90/046 220/1.5 |
| 4,957,804 A | * | 9/1990 | Hendrix | B32B 7/02 428/212 |
| 4,983,433 A | * | 1/1991 | Shirasaki | B32B 5/08 428/36.1 |
| 4,983,449 A | * | 1/1991 | Nee | B32B 11/04 138/105 |
| 5,082,721 A | * | 1/1992 | Smith, Jr. | A62B 17/006 2/81 |
| 5,105,970 A | * | 4/1992 | Malone | B65D 90/06 206/523 |
| 5,143,245 A | * | 9/1992 | Malone | B65D 90/06 206/523 |
| 5,160,472 A | * | 11/1992 | Zachariades | A61L 27/16 264/136 |
| 5,160,767 A | * | 11/1992 | Genske | B29C 47/061 215/261 |
| 5,169,697 A | * | 12/1992 | Langley | B32B 27/08 156/304.1 |
| 5,183,176 A | * | 2/1993 | Meier | B32B 5/18 220/592.26 |
| 5,248,364 A | * | 9/1993 | Liu | B29C 47/0021 156/244.11 |
| 5,261,536 A | * | 11/1993 | Wilson | B29C 47/065 206/386 |
| 5,266,390 A | * | 11/1993 | Garland | B32B 27/12 428/141 |
| 5,284,540 A | * | 2/1994 | Roth | B29C 55/06 156/160 |
| 5,286,576 A | * | 2/1994 | Srail | B32B 27/18 428/297.4 |
| 5,360,129 A | * | 11/1994 | Lee | B32B 3/12 109/49.5 |
| 5,377,856 A | * | 1/1995 | Brierton | B65D 88/14 220/1.5 |
| 5,389,448 A | * | 2/1995 | Schirmer | B32B 27/32 428/336 |
| 5,395,682 A | * | 3/1995 | Holland | B65D 88/14 220/1.5 |
| 5,398,831 A | * | 3/1995 | Avramides | B65D 88/14 220/1.5 |
| 5,401,344 A | * | 3/1995 | Dickson | B29C 70/446 156/184 |
| RE34,892 E | * | 4/1995 | Dunwoodie | B65D 90/021 220/1.5 |
| 5,431,284 A | * | 7/1995 | Wilson | B29C 47/065 206/386 |
| 5,443,874 A | * | 8/1995 | Tachi | B32B 27/08 428/36.6 |

(56) References Cited

U.S. PATENT DOCUMENTS

| | | | |
|---|---|---|---|
| 5,445,883 A | 8/1995 | Kobayashi et al. | |
| 5,454,471 A * | 10/1995 | Norvell | A47J 47/145 206/545 |
| 5,460,884 A * | 10/1995 | Kobylivker | C08L 23/12 428/373 |
| 5,472,760 A * | 12/1995 | Norvell | B32B 5/18 428/71 |
| 5,480,706 A * | 1/1996 | Li | B29C 70/08 428/113 |
| 5,490,567 A * | 2/1996 | Speer | A62C 8/06 169/50 |
| 5,529,363 A * | 6/1996 | Borowski, Jr. | B60J 5/065 160/368.1 |
| 5,547,536 A * | 8/1996 | Park | A41D 31/0061 156/166 |
| 5,567,498 A * | 10/1996 | McCarter | B29C 59/046 2/2.5 |
| 5,570,801 A * | 11/1996 | Younger | B65D 90/021 160/328 |
| 5,578,373 A * | 11/1996 | Kobayashi | B29C 43/228 264/103 |
| 5,601,201 A * | 2/1997 | Looker | B65D 88/005 160/273.1 |
| 5,652,041 A * | 7/1997 | Buerger | B32B 5/26 156/219 |
| 5,658,037 A * | 8/1997 | Evans | B60J 7/085 160/122 |
| 5,667,002 A * | 9/1997 | Neustadt | B65D 88/14 160/368.1 |
| 5,677,029 A * | 10/1997 | Prevorsek | B32B 5/12 428/105 |
| 5,702,657 A * | 12/1997 | Yoshida | D01D 5/426 264/112 |
| 5,761,854 A * | 6/1998 | Johnson | B60P 3/34 135/116 |
| 5,789,327 A * | 8/1998 | Rousseau | B32B 5/26 442/135 |
| 5,819,474 A * | 10/1998 | Strom | E04H 15/32 135/115 |
| 5,851,668 A * | 12/1998 | Sandor | A41D 19/01511 428/332 |
| 5,888,610 A * | 3/1999 | Fournier | E04B 1/86 156/292 |
| 5,915,445 A * | 6/1999 | Rauenbusch | E06B 9/13 160/230 |
| 5,927,025 A * | 7/1999 | Brockman | B65G 69/008 160/124 |
| 5,958,805 A * | 9/1999 | Quinones | B32B 27/02 428/198 |
| 5,976,998 A * | 11/1999 | Sandor | A41D 19/01511 428/373 |
| 5,979,684 A * | 11/1999 | Ohnishi | B62D 29/045 220/1.5 |
| 6,054,205 A * | 4/2000 | Newman | B28B 19/0092 156/181 |
| 6,080,474 A * | 6/2000 | Oakley | B60C 9/0042 428/206 |
| 6,103,372 A * | 8/2000 | Sandor | A41D 19/01511 428/364 |
| 6,113,031 A * | 9/2000 | Williams | B64D 9/00 220/1.5 |
| 6,156,682 A * | 12/2000 | Fletemier | B29C 43/203 428/300.7 |
| 6,161,714 A * | 12/2000 | Matsuura | B62D 29/045 220/1.5 |
| 6,237,793 B1 * | 5/2001 | Fingerhut | B65D 88/14 109/15 |
| 6,280,546 B1 * | 8/2001 | Holland | B32B 27/12 156/157 |
| 6,291,049 B1 | 9/2001 | Kunkel et al. | |
| 6,322,873 B1 * | 11/2001 | Orologio | B29C 51/24 156/145 |
| 6,358,591 B1 * | 3/2002 | Smith | B64C 1/40 428/121 |
| 6,435,101 B1 * | 8/2002 | Marker | B21F 27/08 105/15 |
| 6,446,751 B1 * | 9/2002 | Ahuja | A47H 23/02 181/280 |
| 6,503,856 B1 | 1/2003 | Broadway et al. | |
| 6,511,730 B1 * | 1/2003 | Blair | B32B 3/12 428/116 |
| 6,513,703 B2 * | 2/2003 | Becker | B65D 5/62 220/592.21 |
| 6,701,948 B2 * | 3/2004 | Jopp | E04H 15/001 135/115 |
| 6,711,872 B2 * | 3/2004 | Anderson | B32B 3/12 52/783.17 |
| 6,749,076 B2 * | 6/2004 | Fingerhut | B65D 88/14 109/15 |
| 6,755,232 B1 * | 6/2004 | Holland | B65D 88/125 160/368.1 |
| 6,787,228 B2 * | 9/2004 | Campbell | D02G 3/047 427/157 |
| 6,800,367 B2 * | 10/2004 | Hanyon | D02G 3/442 428/364 |
| 6,802,551 B2 * | 10/2004 | Nelson | B60P 3/205 160/113 |
| 6,818,091 B1 * | 11/2004 | Holland | B32B 27/12 156/192 |
| 6,825,137 B2 * | 11/2004 | Fu | B32B 5/26 2/2.5 |
| 6,918,501 B2 * | 7/2005 | Wang | B65D 88/14 220/1.5 |
| 6,926,188 B2 * | 8/2005 | Hazeyama | H01L 21/4853 228/246 |
| 6,962,188 B2 * | 11/2005 | Coenraets | A62C 2/10 160/180 |
| 6,992,027 B1 * | 1/2006 | Buckingham | B32B 5/26 428/920 |
| 7,001,857 B2 * | 2/2006 | Degroote | A41D 31/0027 428/920 |
| 7,087,300 B2 * | 8/2006 | Hanyon | D02G 3/442 428/364 |
| 7,111,661 B2 * | 9/2006 | Laugenbach | E06B 9/13 160/133 |
| 7,114,756 B2 * | 10/2006 | Nelson | B60P 3/205 160/113 |
| 7,195,025 B2 * | 3/2007 | Choi | E04H 15/32 135/117 |
| 7,210,492 B2 * | 5/2007 | Gerrie | B60J 7/067 135/88.07 |
| 7,264,878 B2 * | 9/2007 | Miller | B32B 5/18 423/445 R |
| 7,311,216 B2 * | 12/2007 | Donnelly | B29C 65/18 220/1.5 |
| 7,622,406 B2 * | 11/2009 | Holland | A41D 31/0061 442/286 |
| D617,522 S * | 6/2010 | Teien | D34/38 |
| 7,785,693 B2 * | 8/2010 | Johnson | B32B 5/18 428/102 |
| 7,805,897 B2 * | 10/2010 | Holland | E06B 9/02 160/108 |
| 7,820,570 B2 * | 10/2010 | Holland | A41D 31/0061 428/215 |
| 7,828,029 B2 * | 11/2010 | Holland | B32B 5/024 156/358 |
| 7,846,528 B2 * | 12/2010 | Johnson | B29C 70/086 428/119 |
| D630,815 S * | 1/2011 | Teien | D34/38 |
| 7,901,537 B2 * | 3/2011 | Jones | D04H 13/007 156/289 |
| 7,913,511 B2 * | 3/2011 | Meyer | F25D 23/063 62/371 |
| 7,972,698 B2 * | 7/2011 | Miller | C04B 38/0032 428/408 |
| 8,002,919 B2 * | 8/2011 | Johnson | B29C 70/086 156/148 |

(56) References Cited

U.S. PATENT DOCUMENTS

| | | | | |
|---|---|---|---|---|
| 8,322,955 B2* | 12/2012 | Arnesen | G06K 19/07749 | 248/346.02 |
| 8,479,801 B2* | 7/2013 | Holland | B65D 88/14 | 160/180 |
| 8,784,605 B2* | 7/2014 | Fingerhut | B32B 7/12 | 156/289 |
| 8,839,842 B2* | 9/2014 | Ashelin | E06B 9/13 | 160/330 |
| 8,973,769 B2* | 3/2015 | Huber | B65D 88/14 | 206/386 |
| 9,051,014 B2* | 6/2015 | Lookebill | B62D 33/048 | |
| 9,090,392 B2* | 7/2015 | Loeschen | B65D 88/005 | |
| D740,555 S * | 10/2015 | Huber | D3/272 | |
| D740,556 S * | 10/2015 | Huber | D3/272 | |
| 9,174,797 B2* | 11/2015 | Holland | B65D 88/14 | |
| 9,296,555 B2* | 3/2016 | Kawka | B32B 5/022 | |
| 9,827,529 B2* | 11/2017 | Rebouillat | B32B 7/02 | |
| 9,930,997 B2* | 4/2018 | Larpenteur | A47J 47/14 | |
| 2001/0001466 A1* | 5/2001 | Fingerhut | B65D 88/14 | 220/1.5 |
| 2003/0098250 A1* | 5/2003 | Sabounjian | A47B 43/04 | 206/298 |
| 2003/0106414 A1* | 6/2003 | Wang | B65D 88/14 | 86/50 |
| 2004/0017789 A1* | 1/2004 | Hoynck | H04W 74/0866 | 370/329 |
| 2004/0045847 A1* | 3/2004 | Fairbank | B65D 88/14 | 206/386 |
| 2004/0058603 A1* | 3/2004 | Hayes | B32B 27/12 | 442/286 |
| 2004/0092379 A1* | 5/2004 | Lewis | C03C 3/087 | 501/70 |
| 2004/0105994 A1* | 6/2004 | Lu | B29C 55/023 | 428/515 |
| 2005/0074593 A1* | 4/2005 | Day | B32B 5/22 | 428/292.1 |
| 2005/0109382 A1 | 5/2005 | Choi | | |
| 2005/0142971 A1* | 6/2005 | Chen | B32B 27/12 | 442/205 |
| 2005/0211839 A1* | 9/2005 | Movsesian | B64C 1/40 | 244/119 |
| 2006/0035555 A1* | 2/2006 | Narayanan | A41D 31/0027 | 442/387 |
| 2006/0138911 A1* | 6/2006 | Ransom | E04H 15/001 | 312/125 |
| 2006/0189236 A1* | 8/2006 | Davis | B32B 27/04 | 442/136 |
| 2006/0239791 A1* | 10/2006 | Morris | B60J 7/102 | 410/119 |
| 2007/0289682 A1* | 12/2007 | Young | B65D 65/02 | 150/154 |
| 2008/0003075 A1* | 1/2008 | Mapitigama | B60P 7/0876 | 410/97 |
| 2008/0070024 A1* | 3/2008 | Curran | B29C 39/006 | 428/293.4 |
| 2008/0102721 A1 | 5/2008 | Holland et al. | | |
| 2008/0110580 A1* | 5/2008 | Hoerner | E06B 9/13 | 160/113 |
| 2008/0145592 A1* | 6/2008 | Johnson | E04C 2/243 | 428/73 |
| 2008/0197649 A1* | 8/2008 | Byler | B65D 90/06 | 296/39.3 |
| 2008/0302049 A1* | 12/2008 | Stoneburner | B60R 13/08 | 52/506.02 |
| 2008/0311336 A1* | 12/2008 | Dolgopolsky | B32B 3/26 | 428/71 |
| 2008/0313980 A1* | 12/2008 | Holland | E06B 9/02 | 52/202 |
| 2009/0004393 A1* | 1/2009 | Rodgers | B32B 5/26 | 427/385.5 |
| 2009/0062432 A1* | 3/2009 | Doesburg | C08G 18/10 | 524/16 |
| 2009/0140097 A1* | 6/2009 | Collier | B32B 5/18 | 244/121 |
| 2009/0183808 A1* | 7/2009 | Sappington | B60J 5/06 | 150/159 |
| 2009/0209155 A1* | 8/2009 | Goulet | A41D 31/0027 | 442/234 |
| 2009/0258180 A1* | 10/2009 | Goulet | A41D 31/0016 | 428/72 |
| 2010/0132894 A1* | 6/2010 | Knutson | E06B 9/13 | 160/113 |
| 2010/0209679 A1* | 8/2010 | Tompkins | B32B 5/028 | 428/201 |
| 2010/0243807 A1* | 9/2010 | Hossain | B32B 27/12 | 244/121 |
| 2010/0270318 A1 | 10/2010 | Dagher et al. | | |
| 2011/0091713 A1* | 4/2011 | Miller | B32B 5/18 | 428/312.2 |
| 2011/0136401 A1* | 6/2011 | Hanusa | B32B 19/02 | 442/189 |
| 2011/0180959 A1* | 7/2011 | Donnelly | B29C 66/436 | 264/241 |
| 2011/0274915 A1* | 11/2011 | Roberson | B29B 17/0042 | 428/327 |
| 2012/0018102 A1* | 1/2012 | Ungs | E06B 9/13 | 160/113 |
| 2012/0111862 A1* | 5/2012 | Siegbert | B65D 88/1618 | 220/62.11 |
| 2012/0118882 A1* | 5/2012 | Holland | B65D 88/127 | 220/1.5 |
| 2012/0151851 A1* | 6/2012 | Cantin | E04B 1/34305 | 52/79.5 |
| 2012/0266561 A1* | 10/2012 | Piedmont | E04C 3/28 | 52/834 |
| 2013/0032260 A1* | 2/2013 | Davies | B64D 9/00 | 150/154 |
| 2013/0161331 A1* | 6/2013 | Pherson | B65D 88/14 | 220/560.01 |
| 2013/0340953 A1* | 12/2013 | Knutson | E06B 9/13 | 160/236 |
| 2014/0329429 A1* | 11/2014 | Eleazer | B32B 5/024 | 442/243 |
| 2014/0335750 A1* | 11/2014 | Adams | B32B 5/022 | 442/57 |
| 2015/0013275 A1* | 1/2015 | Davies | B64D 9/00 | 53/461 |
| 2015/0053086 A1* | 2/2015 | Rebouillat | B32B 7/02 | 96/11 |
| 2015/0246511 A1* | 9/2015 | Lookebill | B62D 33/048 | 442/290 |
| 2015/0246749 A1* | 9/2015 | Huber | B65D 19/0002 | 108/50.02 |
| 2015/0267396 A1* | 9/2015 | Cantin | E04B 1/34305 | 52/79.5 |
| 2015/0343736 A1* | 12/2015 | Kawka | H01M 2/1653 | 429/144 |
| 2016/0039172 A1* | 2/2016 | Kawka | B32B 5/024 | 428/212 |
| 2016/0046441 A1* | 2/2016 | Holland | B65D 88/127 | 220/1.5 |
| 2016/0107816 A1* | 4/2016 | Larpenteur | A47J 47/14 | 220/592.01 |
| 2016/0137408 A1* | 5/2016 | Pherson | B65D 88/14 | 220/560.01 |
| 2016/0332417 A1* | 11/2016 | Kawka | B32B 27/12 | |
| 2017/0043687 A1* | 2/2017 | Preisler | B60N 2/36 | |

FOREIGN PATENT DOCUMENTS

| | | |
|---|---|---|
| EP | 0520745 | 12/1992 |
| EP | 2734458 | 5/2014 |
| GB | 995420 | 6/1965 |
| GB | 2051667 | 1/1981 |
| GB | 2349140 | 10/2000 |
| GB | 2501053 A * | 10/2013 |
| JP | 0088072 | 8/1978 |
| JP | 11210353 | 8/1999 |

(56) References Cited

FOREIGN PATENT DOCUMENTS

| JP | 2004203395 A | * | 7/2004 | |
|---|---|---|---|---|
| WO | 2001074688 | | 10/2001 | |
| WO | 2005016643 | | 2/2005 | |
| WO | 2008054731 | | 5/2008 | |
| WO | 2010088811 | | 8/2010 | |
| WO | 2015136043 | | 9/2015 | |
| WO | 2016016176 | | 2/2016 | |
| WO | WO-2018142133 A1 | * | 8/2018 | ............. B32B 5/022 |

OTHER PUBLICATIONS

English translation of the abstract of DE 3004699, last printed Oct. 17, 2011, 3 pgs.
International Search Report and Written Opinion for PCT/US2012/46870, dated Oct. 5, 2012, 19 pgs.
Supreme Zipper Industries, Zipper Chain, 2010 copyright, last printed Dec. 31, 2015, 2 pgs.
Supreme Zipper Industries, Zipper Terminology Guide, 2010 copyright, last printed Dec. 31, 2015, 10 pgs.
Official Action for U.S. Appl. No. 12/946,979, dated Sep. 4, 2012, 12 pgs.
Official Action for U.S. Appl. No. 12/946,979, dated Jan. 29, 2013, 13 pgs.
International Search Report and Written Opinion for PCT/US2011/059671, dated Mar. 9, 2012, 9 pgs.
Internet Wikipedia encyclopedia on Carbon (fiber), http://en.wikipedia.org/wiki/Carbon_(fiber), last printed Jan. 31, 2012, 5 pgs.
Internet advertisement for Transonite Sandwich Panels, http://www.ebertcomposites.com/transonite.html, last printed Jan. 31, 2012, 2 pgs.
Internet advertisement for Pitched-based Carbon Fiber/Composite, http://www.nsc.co.jp/nsmat/English/business_domain/bd09.html, last printed Jan. 31, 2012, 2 pgs.
Internet advertisement for Vince Kelly's Carbon-Fiber Technology, http://www.goecities.com/capecanaveral/1320/, last printed Jan. 31, 2012, 16 pgs.
International Search Report and Written Opinion for PCT/US2012/70222, dated Feb. 26, 2013, 21 pgs.
English abstract of DE4441842, Nov. 3, 1997, 18 pgs.
English abstract of JP 11210353, last printed Dec. 31, 2015, 2 pgs.
Extended European Search Report for App. No. 16854130.8, dated Jun. 4, 2019, 7 pgs.

* cited by examiner

AIR CARGO CONTAINER AND CURTAIN FOR THE SAME

FIELD OF THE INVENTION

The present disclosure relates to the field of transportation, and, more particularly, to cargo containers for aircraft. More particularly, the present disclosure relates to a fabric end closure for such containers.

BACKGROUND OF THE INVENTION

Cargo is typically transported in containers ("Unit Load Devices"), which are stowed in cargo holds either below the deck of passenger aircraft or below and above the deck in transport aircraft. The size and shape of Unit Load Devices vary depending upon the type of aircraft in use. Typically, and regardless of the shape or geometry of the container, one end or side of the cargo container is open for loading and unloading cargo. Various door closures have been used for opening and closing the open ends of such containers. One type of closure has been a rigid door closure which covers the opening to reduce tampering, to prevent the loss of small items, and to prevent the cargo from being exposed to dirt, moisture, and ultraviolet light. Another type of closure includes a fabric closure or curtain. In all aircraft, the gross weight of the airplane is a substantial factor, because of the cost of fuel. Even a slight reduction in weight is significant, therefore fabric doors are often preferred.

Curtain closures for air cargo containers serve several purposes. Primarily, closures keep cargo contained inside of an air cargo container and minimize the unwanted intrusion into the air cargo container. Improvements have been made in curtain closures to increase their strength using high tenacity fibers to form the curtains. These curtains have had the effect of lowering maintenance costs because the curtains having high tenacity fibers may resist damage from the rough handing common to air cargo containers. Particularly, sliding cargo within the container is unlikely to puncture the high tenacity curtains. Further, curtains made from high tenacity fibers can resist puncture from cargo handling equipment such as fork lifts.

To further increase performance and reduce wear on the curtains, curtains for air cargo containers have been coated, laminated or impregnated with materials such as ethylene vinyl acetate (EVA) to render the fabric curtains substantially waterproof and more highly resistant to oils, gasoline, and other chemicals that may be present in an airport or other shipping environment. Even still, further advances in performance can be made.

SUMMARY

Inventors have found that further improvements can be made to curtains that improve upon the tamper-resistance of the curtains. In other instances, improvements can be made in the ability for the curtain to insulate the container with respect to temperature. In yet other instances, curtains can be improved both in their ability to insulate and their ability to avoid being accessed by an intruded, e.g. being tampered with.

In one embodiment the present disclosure provides a fabric closure for an air cargo container, and the air cargo container having the same, wherein the fabric closure is a curtain formed of a fabric layer; and an insulating layer attached to or incorporated into the inside of the fabric layer. The curtain may optionally include features to enhance the cut-resistance or fire-resistance of the curtain.

In another embodiment, the present disclosure provides a fabric closure for an air cargo container, and the air cargo container having the same, wherein the fabric closure is a curtain having a fabric layer; and a cut-proof reinforcing layer attached to or incorporated into the fabric layer. The curtain may optionally include features to enhance the thermal insulation and fire-resistance provided by the curtain.

These and other aspects of the present disclosure will become apparent to those skilled in the art after a reading of the following description of the preferred embodiments when considered in conjunction with the drawings.

DETAILED DESCRIPTION

Exemplary embodiments of this disclosure are described below and illustrated in the accompanying figures, in which like numerals refer to like parts throughout the several views. The embodiments described provide examples and should not be interpreted as limiting the scope of the invention. Other embodiments, and modifications and improvements of the described embodiments, will occur to those skilled in the art and all such other embodiments, modifications and improvements are within the scope of the present invention. Features from one embodiment or aspect may be combined with features from any other embodiment or aspect in any appropriate combination. For example, any individual or collective features of method aspects or embodiments may be applied to apparatus, product or component aspects or embodiments and vice versa.

Unless otherwise defined, all technical and scientific terms used herein have the same meaning as commonly understood by one of ordinary skill in the art to which this disclosure belongs. The terminology used in the description of the embodiments herein is for describing particular embodiments only and is not intended to be limiting of the invention. As used in the description and the appended claims, the singular forms "a," "an," and "the" are intended to include the plural forms as well, unless the context clearly indicates otherwise.

Unless otherwise indicated, all numbers expressing quantities of ingredients, properties such as density, weight, temperature, and so forth as used in the specification and claims are to be understood as being modified in all instances by the term "about." Accordingly, unless otherwise indicated, the numerical properties set forth in the specification and claims are approximations that may vary depending on the desired properties sought to be obtained in disclosed embodiments.

As used in the description and the appended claims, the phrase "unit load devices (ULDs)" also known as "air cargo containers," is defined as containers used to load luggage, freight, mail, and the like on wide-body aircraft and some specific narrow-body aircraft.

Figure 1:
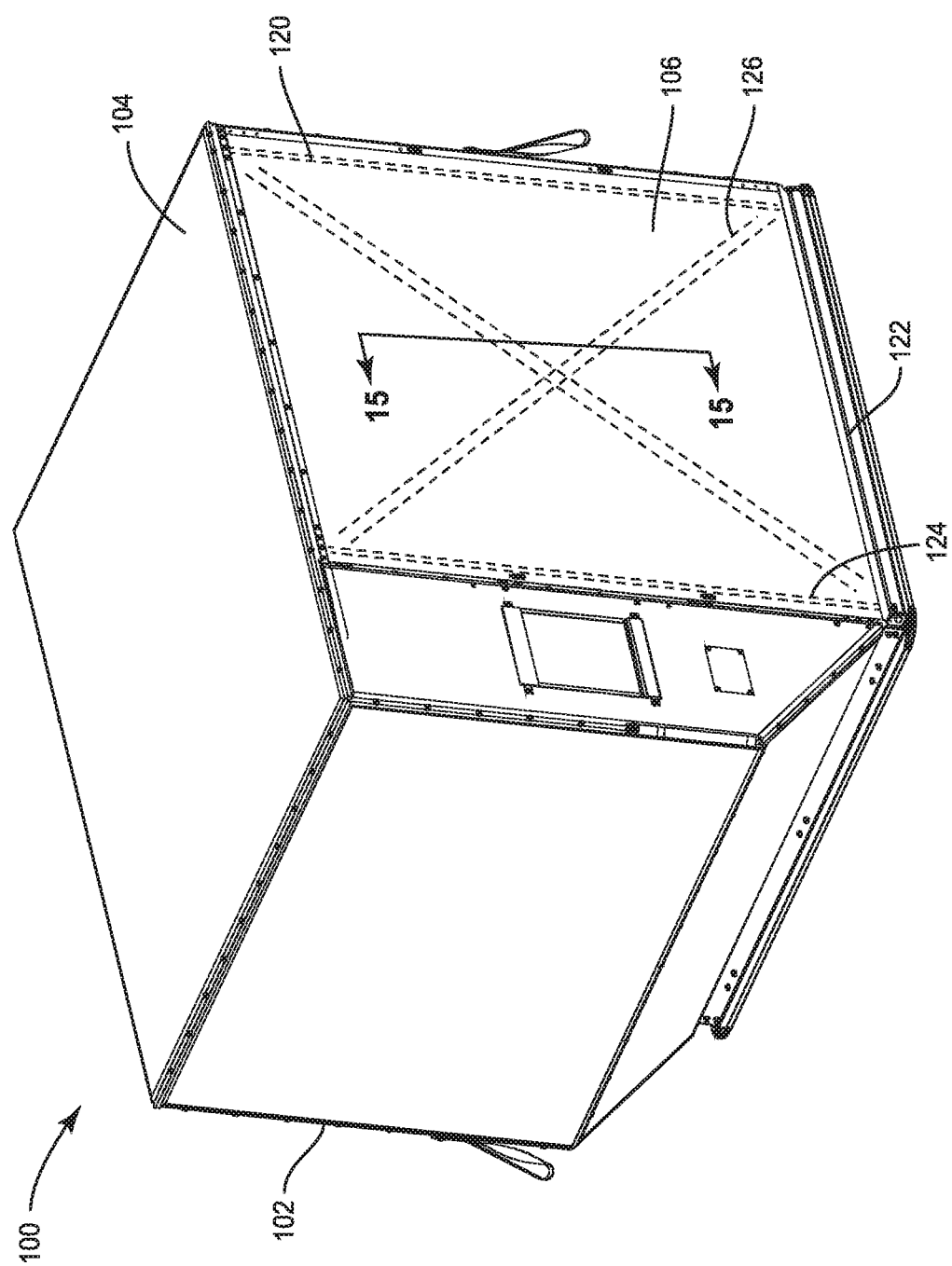
FIG. 1 shows a perspective view of an air cargo container according to the present disclosure.

Referring now to FIG. 1, there is illustrated an air cargo container or ULD or simply container 100. Air cargo containers are designed to load luggage, freight, and mail in aircraft, often in the lower deck area. In this regard, the cargo containers may be configured similar to the shape of the aircraft. Some (LD1's-LD3's) are half-width and some (LD6) are full width of the aircraft. The container 100 may include a frame 102 presenting a generally rectangular shape with an offset designed to more closely follow the outline of the lower half of an aircraft. The container 100 may further include a cargo opening defined by a portion of the frame 102. The frame 102 may be formed from any substantially rigid material, such as aluminum, steel, composites, temperature resistant plastics, other metals and non-metals.

The frame 102 may support a plurality of panels 104 forming the walls, and optionally the roof and floor of the container 100. In some embodiments, the panels 104 may be constructed together such that a separate frame may be eliminated. The panels 104 may be preferably a composite panel, as discussed below, for at least their lightweight, thermal insulating, and high strength characteristics. Alternatively, the panels 104 may also include aluminum, aluminum/Lexan composite, webs, fabrics, or some other light weight material. The cargo opening may be substantially sealed, and selectively closed, by a door, referred to herein as a curtain 106, to reflect the flexible nature of doors according to the present disclosure.

Figure 2:
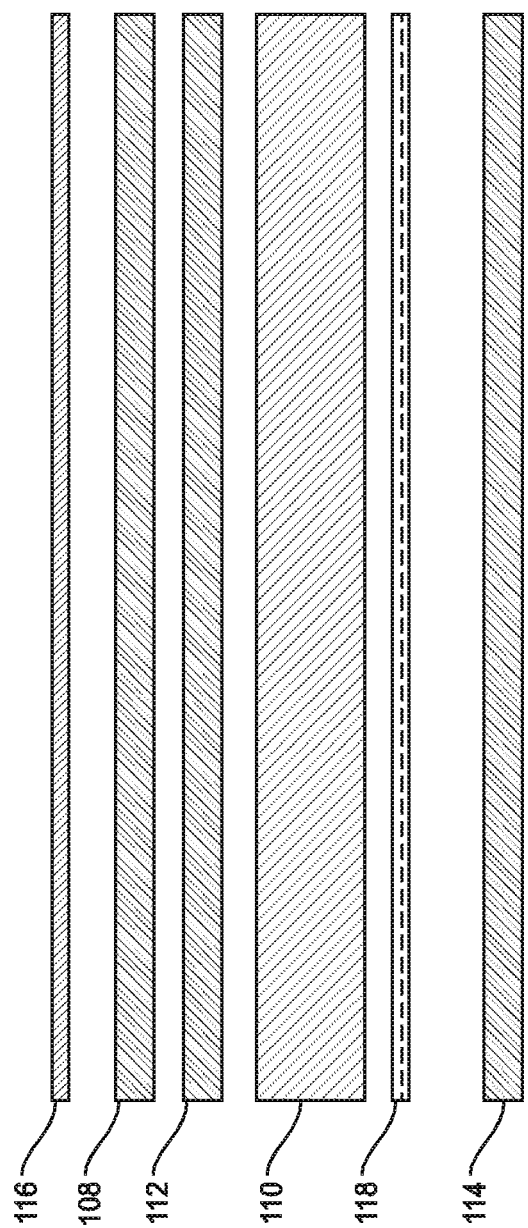
FIG. 2 shows an exploded cross section of the curtain closure of the container of FIG. 1.

FIG. 2 shows an exploded cross sectional view of the curtain 106. The curtain 106 may include one or more exterior, outer layers 108, one or more insulating layers 110, one or more reinforcing layers 112, and one or more optional interior, inner layers 114. As used herein, the terms outside and outer as used with respect to the interior and exterior of the cargo container 100. Therefore an inner layer of a curtain 106 would be desirably, but not necessarily, facing into the container 100 when the curtain 106 is closed. The curtains 106 of the present disclosure include at least one of an insulating layer 110 or a reinforcing layer 112. Some embodiments include both an insulating layer 110 and a reinforcing layer 112. The reinforcing layer 112 may also be referred to as a cut-proof layer or a tamper-proof layer.

The outer layer 108 may be a conventional fabric sheet such as nylon, canvas, polyester, and other such materials. The fabrics are often coated with a water resistant or waterproof coating consisting of vinyl, polyethylene, neoprene, hypalon, or other such materials.

The outer layer 108 may, alternatively, be a high tenacity fabric layer made from at least 50% high tenacity fibers and preferably substantially 100% high tenacity fibers. As used herein, the term "high tenacity fibers" means fibers which have tenacities equal to or greater than about 7 g/d. Preferably, the high tenacity fibers have tenacities equal to or greater than about 10 g/d, more preferably equal to or greater than about 15 g/d, even more preferably equal to or greater than about 20 g/d, and most preferably equal to or greater than about 25 g/d. Examples of high tenacity fibers include highly oriented high molecular weight polyolefin fibers, particularly high modulus polyethylene fibers, highly oriented high molecular weight polypropylene fibers, aramid fibers, polybenzoxazole fibers such as polybenzoxazole (PBO) and polybenzothiazole (PBT), polyvinyl alcohol fibers, polyacrylonitrile fibers, liquid crystal copolyester fibers, basalt or other mineral fibers, as well as rigid rod polymer fibers, and mixtures and blends thereof. Preferred fibers may include high tenacity ultra-high molecular weight polyethylene (UHWMPE) fibers such as SPECTRA®, aramid fibers sold under the trademarks Kevlar® or Nomex®, or liquid crystal fibers such as those sold under the trademark Vectran®.

One example outer layer 108 may be a woven fabric formed from SPECTRA® ultra-high molecular weight polyethylene fibers. In one embodiment, the fabric preferably has between about 15 and about 45 ends per inch (about 5.9 to about 17.7 ends per cm) in both the warp and fill directions, and more preferably between about 17 and about 33 ends per inch (about 6.7 to about 13 ends per cm). The yarns are preferably each between about 650 and about 1200 denier. The result is a woven fabric weighing preferably between about 2 and about 15 ounces per square yard (about 67.8 to about 508.6 g/m2), and more preferably between about 5 and about 11 ounces per square yard (about 169.5 to about 373.0 g/m2).

The outer layer 108 may be formed of a fire resistant fabric such as, for example, a woven fabric of basalt, carbon, or fiberglass fibers with an intumescent coating (soft char or harder char).

The outer layer 108 may include a protective layer 116 producing a laminated fabric. For example, the Spectra® fabric described above may be coated or laminated with a thermoplastic film, to provide additional protection from the elements, such as waterproofing. As used herein, the terms "coated" and "laminated" may be used interchangeably to describe one or more protective layers 116 applied to a fabric substrate, such as the outer layer 108. The protective layer 116 may be a thermoplastic film bonded to at least one side of the base fabric. The thermoplastic film may comprise ethylene vinyl acetate, high density polyethylene, low density polyethylene, or a combination of the two. It has been found that polyethylene and ethylene vinyl acetate (EVA) films can be made to adhere to fabrics constructed from high tenacity polyethylene fibers without the use of a bonding agent under appropriate laminating conditions.

In some embodiments, the temperature of the cargo within a ULD may be better maintained with a fabric closure designed with thermal insulation properties in mind. For example, a relatively insulated fabric door may extend how long the cargo is able to maintain a cool internal temperature as an aircraft idles on the ground during a hot day waiting to take off. The insulating layer 110 may take a number of forms. In one embodiment, the insulating layer may comprise one or more plies of bubble film. The air present in the bubble film providing insulation, e.g. an increased R value, for the curtain 106 so that an initial temperature within the container 100 may be maintained for longer periods that comparable fabric doors without insulating layers 110. Suitable products may be available from Innovative Insulation, Inc., of Arlington, Tex.

Other materials that provide insulation, are lightweight, and maintain the relative flexibility of the curtain 106 include silica aerogels, elastomeric films such as polyurethane or various rubbers, flexible polymer foams such as cross-linked polyethylene or polypropylene. Preferred insulation will not absorb meaningful amounts of water, and will meet flammability specifications set forth by the appropriate Aviation Authorities. An additional feature that may be incorporated in the insulation layer 110 is using a fire resistant or suppressive foam product to contain interior fires and act as a fire block.

The insulating layer 110 may be incorporated as part of the curtain 106 in a variety of ways. In one embodiment, the insulating layer 110 is sewn to an inner surface of the outer layer 108. In other embodiments the layers may be laminated or otherwise bonded together.

Figure 3:
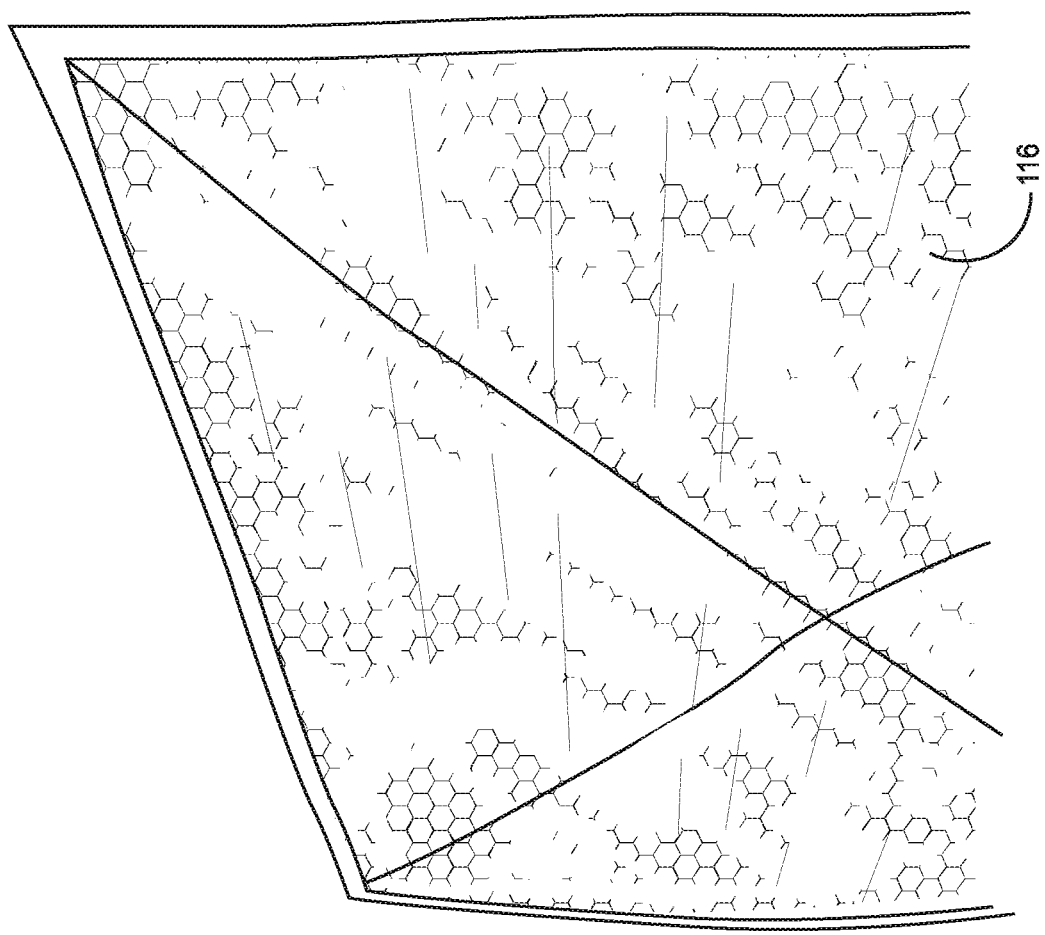
FIG. 3 is an inside view of a metalized layer disposed on an insulating layer of the present disclosure.

In some embodiments, the insulating layer 110 may be covered by a metalized layer 118, such as a foil layer, as seen in FIG. 3. As is known in the art, providing a reflective metalized layer 118 may further decrease the ability for heat energy to pass through the insulating layer 110 or curtain 106.

Figure 9:
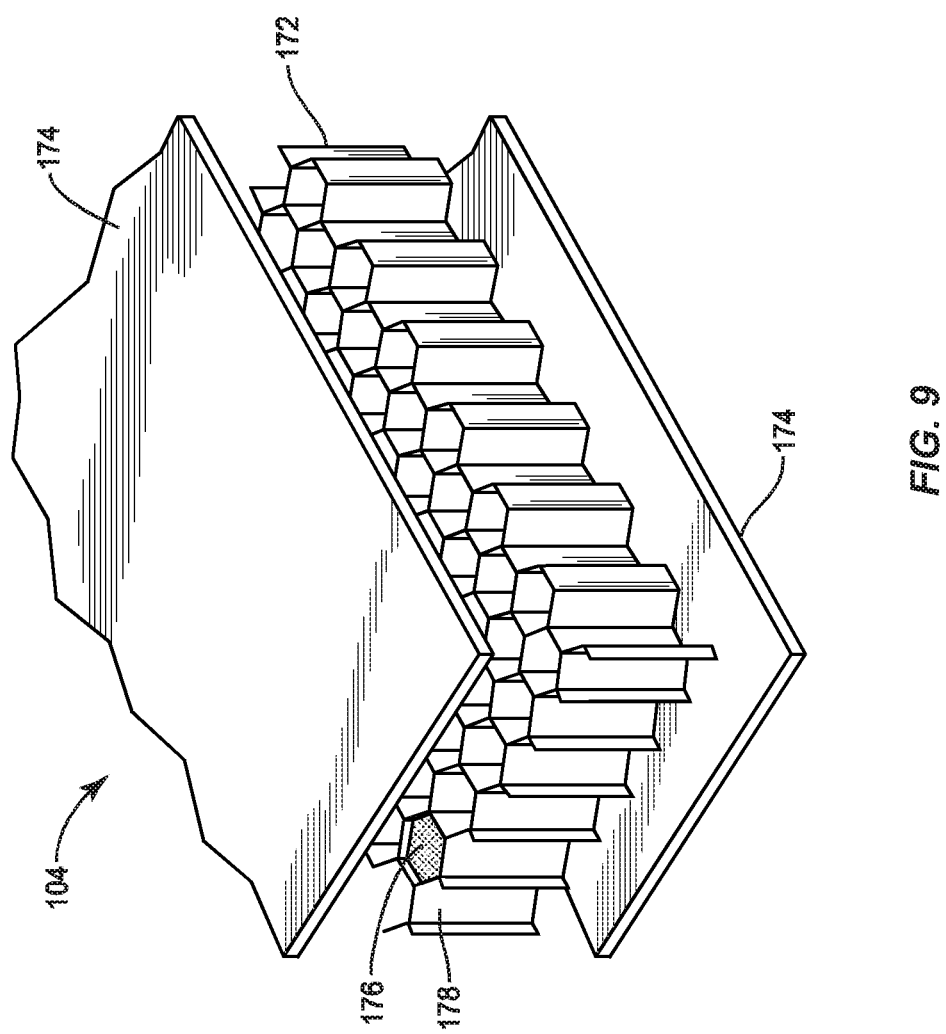
FIG. 9 shows an exploded view of a suitable panel for the air cargo container of FIG. 1.
Figure 15:
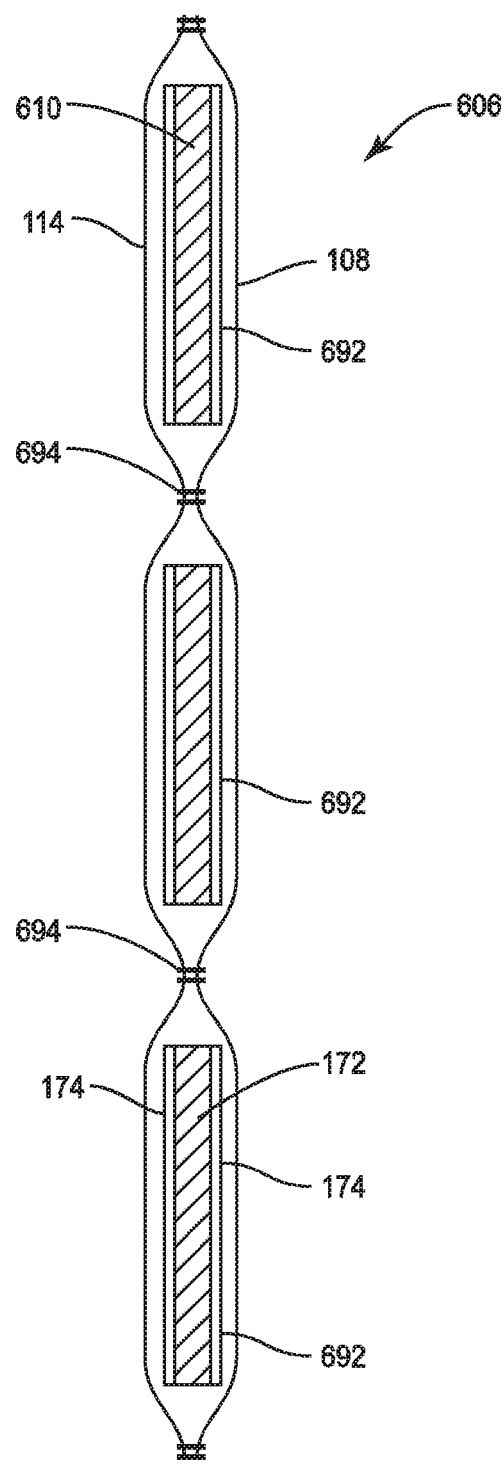
FIG. 15 shows a cross section of a curtain closure according to another embodiment along representative line 15-15 in FIG. 1.

Turning to FIG. 15, a cross section of a curtain 606 is shown according to another embodiment, the cross section taken along a line equivalent to 15-15 in FIG. 1. The curtain 606 includes an outer layer 108 and an inner layer 114 of flexible fabric as discussed above. A protective layer and a dedicated reinforcing layer may be optionally included. The illustrated embodiment of the curtain 606 includes an insulating layer 610 comprising a plurality of rigid panel segments 692 sandwiched between the outer layer 108 and the inner layer 114. The rigid panel segments 692 may be constructed as discussed below with respect to the panels 104, including a core 172 laminated between a pair of skins 174 (FIG. 9). The number of panel segments 692 may vary to increase the flexibility of the curtain 606. For example, using a larger number of segments 692, each spanning a smaller portion of the height of the curtain 106, would produce a more flexible door.

The illustrated construction of the curtain 606 provides for bend regions, or hinges 694, in between the panel segments 692 where the inner layer 114 and the outer layer 108 can come together and provide an area where the curtain 606 may be folded. The hinges 694 may produce a relatively weak spot of the curtain 606. To increase security at these locations, patches of the cut-proof reinforcing layer may be selectively provided in areas of the curtain 606 corresponding to the hinges 694. One or more layers present at the hinges 694 may also be constructed from fire resistant materials to even further enhance the security of the curtain 606.

The use of rigid panel segments 692 enhances horizontal stiffness of the curtain 606 when in the closed position to prevent bulging that could be caused by the weight of cargo within the container. As discussed above, the panels 104 (FIG. 9) have insulating properties, and therefore, when used as the rigid panel segments 692, provide insulating properties to the curtain 606. Rigid panel segments 692 constructed in accordance with the panels are very strong, may be constructed to be fire resistant, and have sufficient thickness to resist cutting with hand held implements. Therefore, adding rigid panel segments 692 as, or in addition to, the insulating layer of the curtain 606 provides a high degree of security at those locations of the panels similar to a reinforcing layer.

The configuration of the curtain 606 having hinges 694 and relatively rigid panel segments 692 is not necessarily limited to the use of composite panels consistent with the construction of the panels 104 (FIG. 9). Instead, the relatively rigid panel segments 692 may be rendered relatively rigid by a thick layer of insulating material. For example, the rigid panel segments 692 may comprise the rigid closed-cell foam 172 without additional skins. Alternatively, the rigid panel segments 692 may be relatively soft open-cell foam of sufficient thickness to resist substantial bending.

Returning to FIG. 2, some embodiments may include one or more reinforcing layers 112, particularly in embodiments including a protective layer 116 applied to the exterior layer 108. The inventors have found that the lamination of the high tenacity layers may have a negative impact on the curtain's resistance to being cut with shape objects, such as a box cutter.

The reinforcing layer 112 may comprise an uncoated fabric comprising high tenacity fibers as discussed above with respect to optional features of the outer layer 108. A function of the reinforcing layer 112 is to increase the slash-resistance of the curtain 106. One example reinforcing layer 112 may be a dry woven fabric formed from SPECTRA® ultra-high molecular weight polyethylene fibers.

The inventors have found that a dry, uncoated fabric made from high-tenacity fibers is significantly more resistant to being intentionally cut or slit with a strong, sharp object such as a box-cutter. Inventors believe that the fibers and yarns in a dry weave have significant individual give or movement within the fabric. Therefore, when a blade encounters a yarn in the uncoated fabric, the yarn will tend to deform or bend instead of being cut. On the other hand, the coated fabric containing similar high tenacity yarns will be more susceptible to being sliced open with a shape blade. The high tenacity yarns are bound together and made more rigid when the fabric or coated or laminated. As a result, when the blade encounters each yarn, the yarns are stiffer and the blade is able to break through the yarn more easily.

The inventors have discovered that the combination curtain 106 that combines a coated waterproof outer layer, e.g. because of a protective layer 116, with a dry uncoated reinforcing layer 112 on the inside of the waterproof layer forms a curtain 106 that significantly increases security against being cut open while having the benefits of a waterproof layer on at least the outside. Therefore the combination curtain 106 provides benefits beyond the use of a coated or uncoated fabric of high tenacity yarn alone. Though a dual layer curtain 106 will necessarily weigh more than a single layer curtain, the increase in weight relative to the container 100 as a whole may be considered marginal for the increase in security of the disclosed curtains 106.

The uncoated high tenacity fabric is preferably sewn to the outer layer as an inward layer, but the uncoated high tenacity fabric could be used as an outermost layer as well. By sewing the layers together, the possible drawbacks of the protective layer 116 having coated the high tenacity fibers are not imparted upon the reinforcing layer 112 made from uncoated high tenacity fibers. Preferably, the reinforcing layer 112 is present across substantially the entire area of the curtain 106. In other embodiments, the reinforcing layer 112 may selectively back the outer layer 108. In yet other embodiments, the reinforcing layer 112 may be bonded to the outer layer 108. Bonding may occur at discrete locations spread throughout the area of the curtain 106. Each of the bonding locations may be only an inch or two in diameter. With this approach, even if the curtain 106 could be cut through and along a length of the bonding location, the resulting opening may be sufficiently small to prevent passage of an intruder's hand.

In other embodiments, the reinforcing layer 112 may comprise a metal mesh. The mesh may be formed from metal wire comprising steel or stainless steel. The gauge of the mesh should be sufficient to resist being cut by handheld implements like knives, scissors, razor blades, etc., but not so large as to add significantly to the weight of the curtain 106. In some embodiments a plurality of reinforcing layers 112 may be included. Each of the plurality of reinforcing layers 112 may be substantially similar or each may have a different structure. For example, a curtain 106 may include an uncoated fabric of high tenacity yarn and a layer of metal mesh.

Where the reinforcing layer 112 comprises a metal mesh, the reinforcing layer may be bonded or laminated to the outer layer 108. For example, an EVA film may bond the metal mesh to an inner surface of the outer layer 108.

The optional inner layer 114 may be a fabric layer substantially similar to the outer fabric layer 108 with or without the addition of one or more protective layers 116.

Returning to FIG. 1, the curtain 106 may be provided with a hem along the top and both sides thereof through which metal strips extend. Holes may be drilled through the metal strip at spaced points and corresponding apertures provided in the fabric in both folds of the hem. Rivets may then attach the sides and top to adjacent panels 104 or portions of the frame 102. As discussed below, other embodiments may attach the curtain 106 to the container 100 using less permanent methods, such as using the combination of web straps and releasable fasteners.

The curtain 106 may include a pair of spaced apart vertical openings 120 extending from a bottom edge 122 of the curtain 106 to a point adjacent to, but spaced slightly from the edge of a top wall of the container 100. A slide fastener 124 may extend along the adjacent edges of each of the vertical openings 120. The slide fasteners 124 should be at least about 10 gauge. Slide fasteners 124 may be a preferred method of sealing the selectively openable vertical openings 120 because the slide fasteners 124 highly restrict the ability for air to pass through a closed vertical opening. For insulation purposes, limiting the ability for air to travel between the interior and exterior of the container 100 improves the ability for the container to maintain its initial internal temperature when loaded with cargo. However, the slide fastener 124 may present an area of weakness for the curtain 106. Preferably, the slide fastener 124 may have similar cut-resistant properties as the rest of the curtain 106. In one example, the tape of the slide fastener 124 may be an uncoated woven material constructed of high tenacity fibers similar to one embodiment of the reinforcing layer 112. Those high tenacity fibers may be of the fire resistant type, such as basalt, carbon, or fiberglass fibers to help contain an internal fire.

Figure 4:
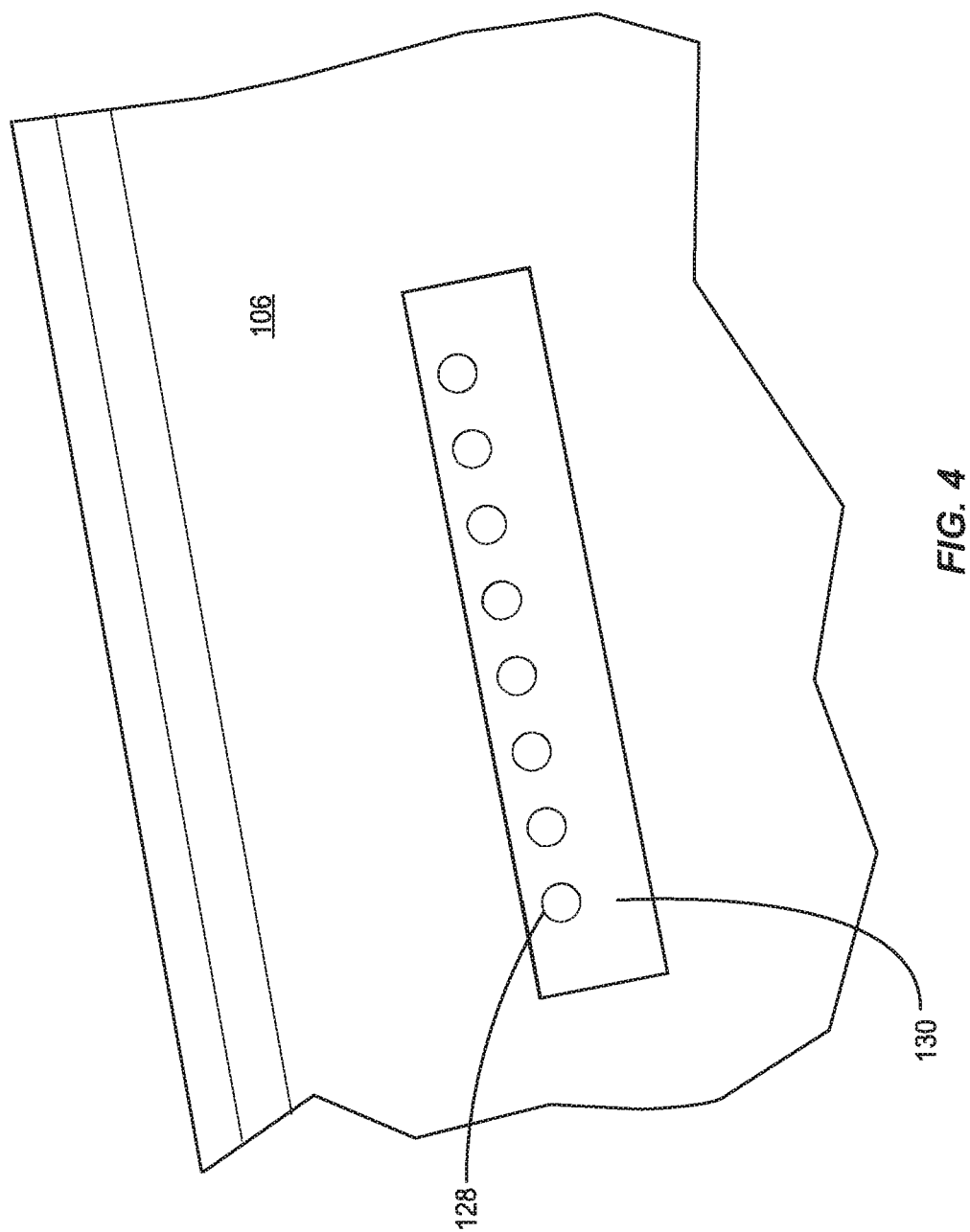
FIG. 4 shows a detailed view of an optional venting feature of the curtain closure of FIG. 1.

The curtain 106 may be further provided with stiffening strips 126 sewn in or otherwise affixed to one surface thereof, as for example, in the X-pattern shown. Other patterns are also possible. For purposes of pressure equalization, as seen in FIG. 4, vent holes 128 may be added through the curtain 106. A cover 130 may be sewn onto the curtain 106 to limit air passage through the vent holes other than due to pressure equalization. Limiting movement of air from inside the container to outside the container will help maintain the internal temperature of the container 100 as desired by embodiments of the present disclosure. The cover 130 may be sewn along three sides with the bottom left open for ventilation. The cover 130 may be formed from one or more of the layers present in the curtain 106.

Turning to FIGS. 5-8, tightly securing the bottom edge 122 of the curtain 106 to the container 100 may be important for several reasons including: prevention of unwanted intrusion into the container, prevention of small cargo items escaping the container, and prevention of significant transfer of air that can significantly impact the ability to maintain the internal temperature of the container 100.

Figure 5:
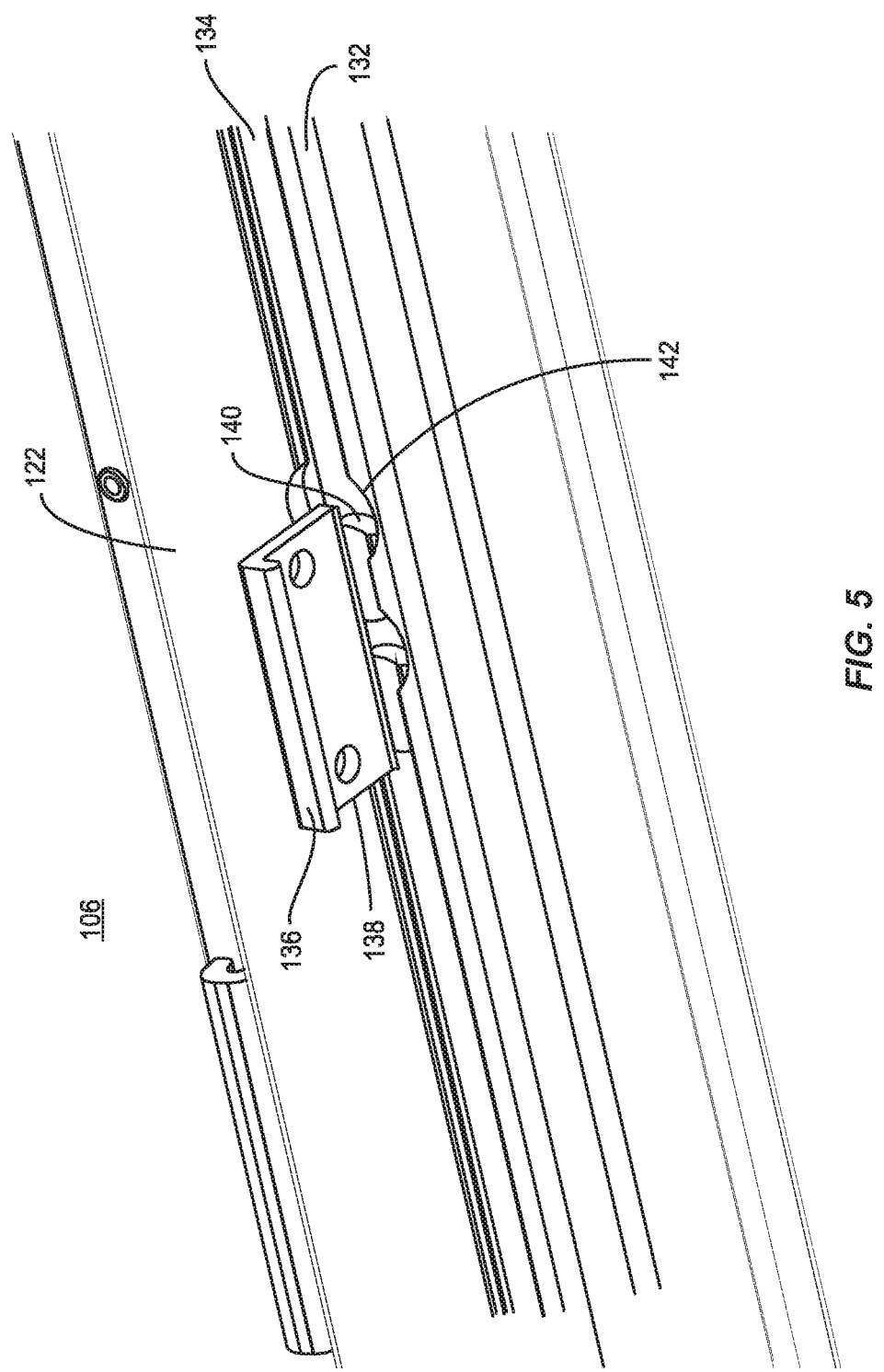
FIG. 5 shows the engagement between the curtain and the bottom wall according to one embodiment.
Figure 6:
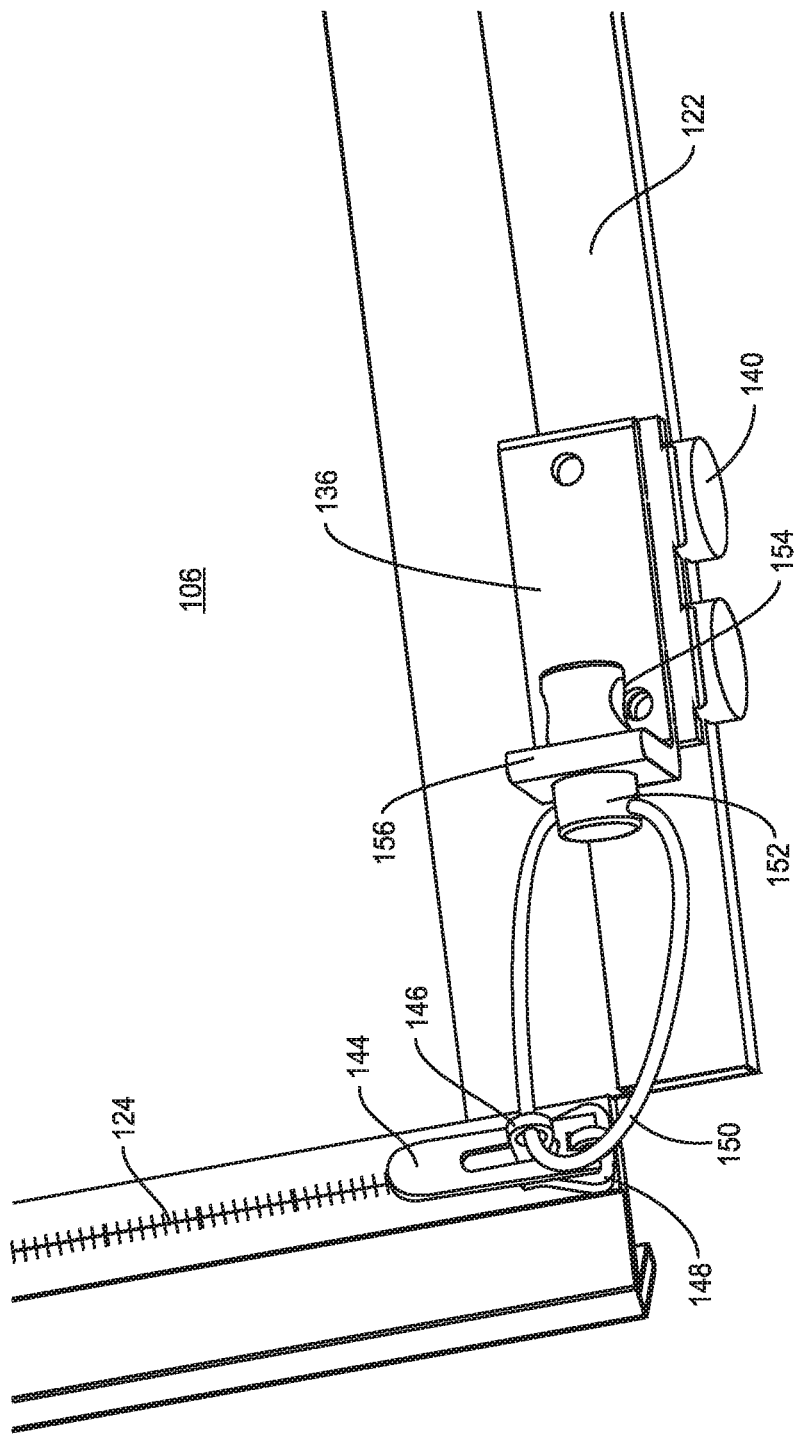
FIG. 6 shows the bottom of the curtain according to another embodiment.

As seen in FIG. 5, cargo containers often include a front rail 132 with a T-slot 134 therein. The bottom edge 122 of the curtain 106 may be provided with a plurality of cleats 136 which may be riveted or lock-bolted through the curtain 106 adjacent the bottom edge 122 thereof. For reinforcement the bottom edge 122 may also be formed by a hem through which a thin strip (¾"×³⁄₁₆" for example) of fiberglass composite, carbon composite, aluminum, or other light weight metal extends. The strip distributes the load between the cleats 136. The cleats 136 are formed of some appropriate strong hard polymeric or metallic material and include a base portion 138 and a locking portion in the form of a pair of circular members 140 extending downwardly therefrom. The locking portion (circular members 140) is secured to the base portion 138.

Two or more sets of two bores 142 are provided through the top wall forming the T-slot 134 which receives the circular members 140 of the cleats 136, which are so sized and shaped as to ride easily in the T-slot 134. Once in the track, movement of the cleats 136 along the track in such a manner that the circular members 140 are no longer aligned with the bores 142 will retain the bottom edge 122 of the curtain 106 in place.

Security may be increased further by providing any one of a variety of locks to prevent the undesired or unidentified opening of the curtain 106. In one example shown in FIG. 6, the slide fasteners 124 may be of the locking type that includes a tab 144 and a loop 146. When the tab 144 is lifted upwardly, the zipper slide 148 is locked and cannot be moved. The loop 146 extends through the tab 144, and when a wire 150 is inserted therethrough, the tab 144 cannot be lowered. The wire 150 may lead to a pin 152 attached thereto. A hole 154 may extend through the opposite end of the pin 152. The cleat 136 may include an L-shaped flange 156 extending outwardly therefrom. An opening in the flange 156 may receive the pin 152. When a security tag (FIG. 8) or combination lock is inserted in the hole 154, the cleat 136 is limited in its movement along the T-slot (FIG. 5), and the length of the wire 150 is such that the cleat 136 cannot be moved back to a position where the circular members 140 are aligned with the bores 142 (FIG. 5).

Figure 7:
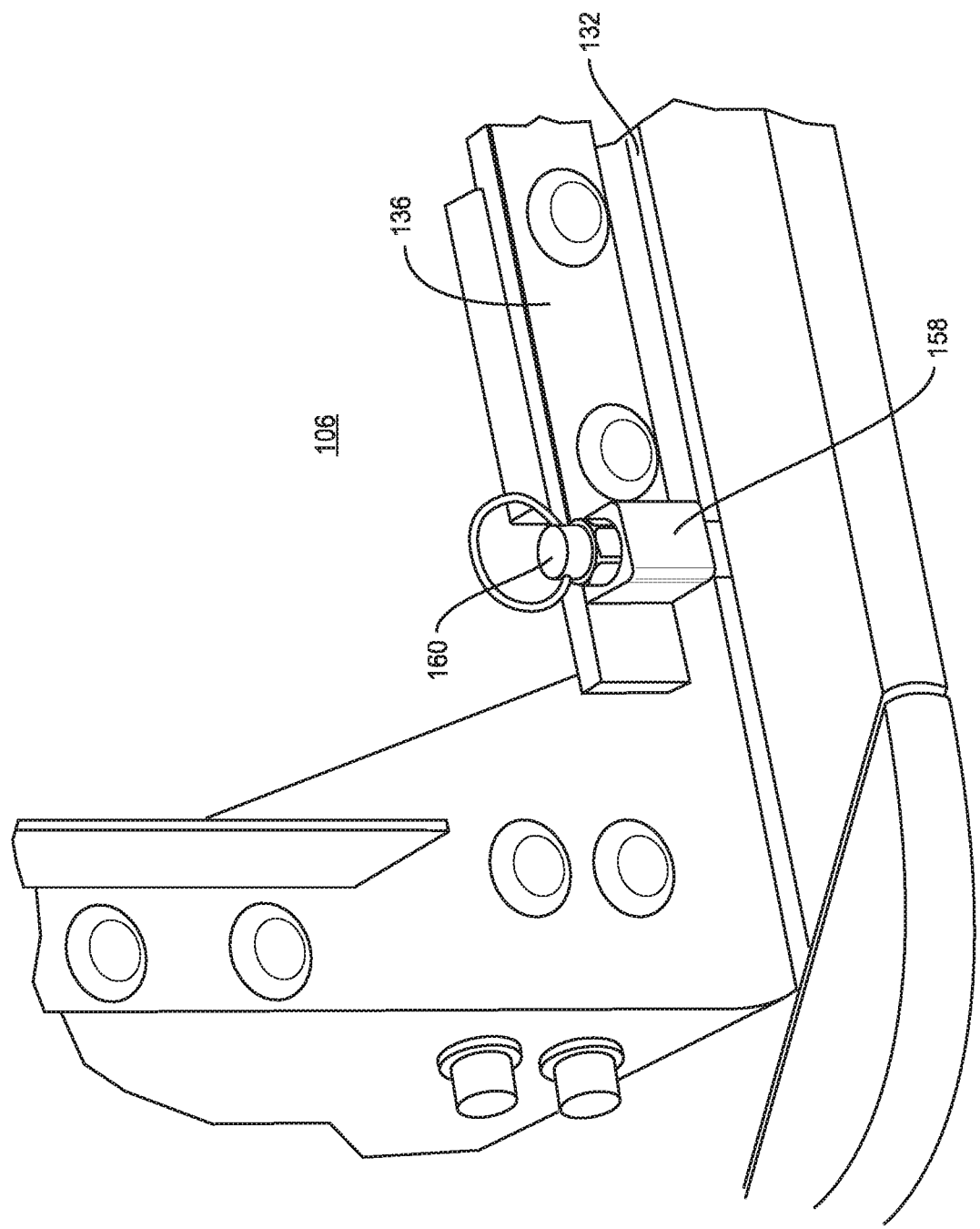
FIG. 7 shows the bottom of the curtain engaged with the bottom wall of the container according to another embodiment.

FIG. 7 shows another lock embodiment where the cleat 136 includes an enlarged boss 158 at the end adjacent to a slide fastener of the curtain 106. A channel through the boss 158 may receive a spring-loaded detent pin 160. The front rail 132 may include a slot that receives the detent pin 160 when the cleat 136 is inserted in the T-slot and moved to the seated position.

Figure 8:
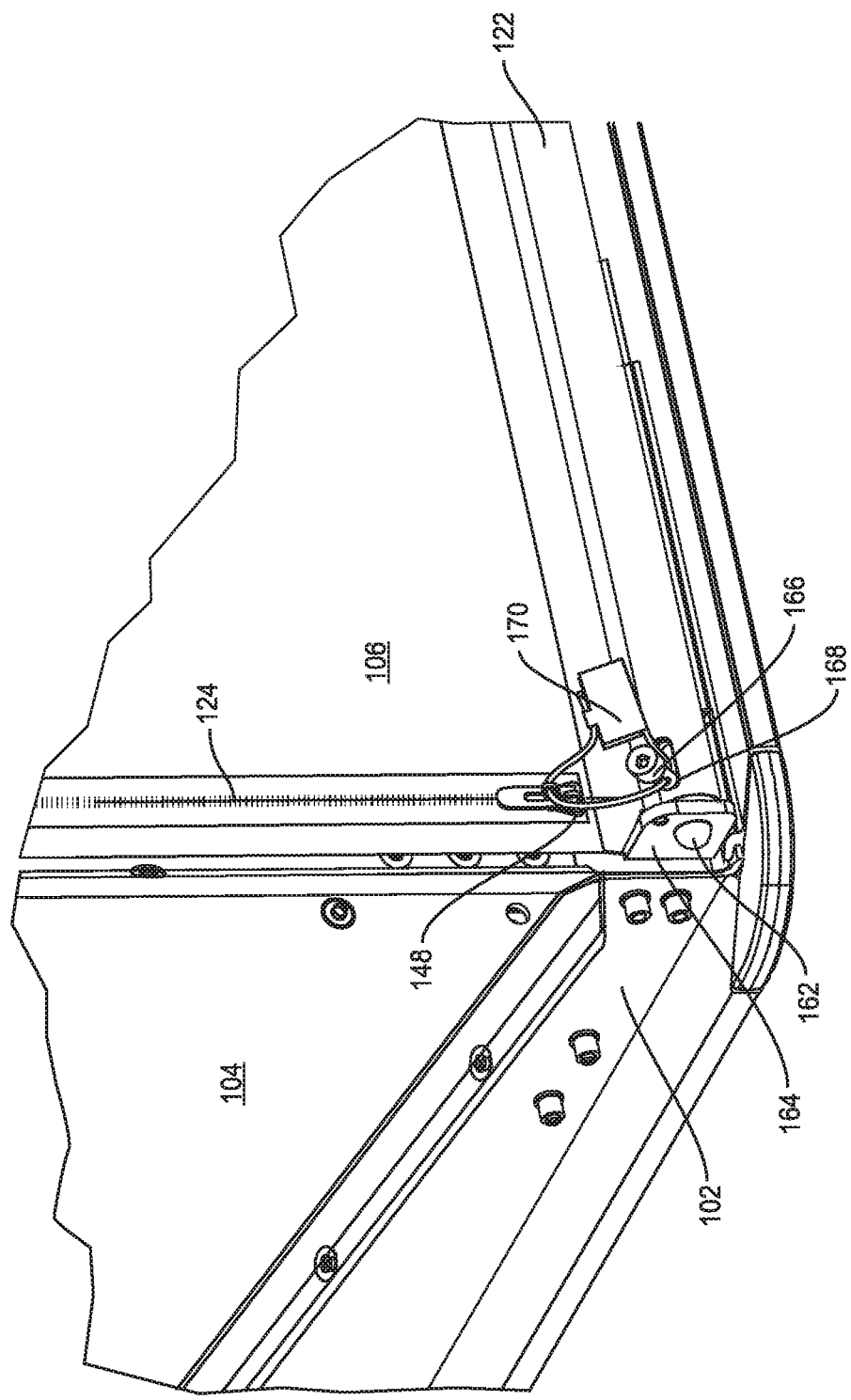
FIG. 8 shows the bottom of the curtain engaged with the bottom wall of the container according to yet another embodiment.

FIG. 8 shows yet another lock embodiment for securing the bottom edge 122 of the curtain 106 in the closed position. The bottom edge 122 of the curtain 106 may include a rigid (preferably hollow) bar received into a hem in the fabric itself. The bar is preferably a carbon fiber bar, selected because of its light weight, but could also be aluminum or other material. On one end of the bar is a spring loaded pin 162 that fits into a hole in an angle bracket 164 welded or otherwise attached to the front face of the container frame 102. The spring loaded pin 162 may be released by a spring loaded handle 166, which, when retracted, allows the spring loaded pin 162 to be removed from the hole in the angle bracket 164. The handle 166 may be provided with a transverse hole 168. A security tag 170 may extend through the transverse hole 168 in the handle 166 and either through the angle bracket 164 or through a portion of the zipper slide 148.

Referring now to FIG. 9, an exploded view of an example panel 104 is shown. The panel 104 includes a core 172 and a skin 174 attached in some appropriate manner to each surface thereof.

The core 172 may include foam 176. The foam 176 may be a fire resistant foam having a density between 0.75 lbs./ft3 (pcf) to 20 pcf, however, a density of between 1.9 pcf and 7.4 pcf is preferred. Densities over 20 pcf would work well as a structural core and as an insulation material, but weight of the final product then becomes more of a question and perhaps prohibitive. The typical foam used in composite construction is a closed-cell foam. Because liquid resin is often used in the construction and/or bonding materials, it is important that the foam 176 be unable to "soak up" the resin. The closed-cell foam provides enough surface "roughness" for excellent bonding without allowing resin to impregnate the core 172. Example foams include phenolic foam, carbon foam, or ceramic foam. Other polymeric foams may also be used, especially if fire resistance is not critical.

Any thickness of foam 176 can be used to create the core 172. For the present application, the foam 176 acts as a thermal insulator. In the present application, it is anticipated that foam thickness will preferably fall between the values of 0.25 inches-2.0 inches for the majority of containers, but slightly greater thicknesses are possible. It will be appreciated that the thicker the foam, the greater the degree of thermal insulation.

The core 172 may also include a honeycomb matrix 178. The combination of the honeycomb matrix 178 and the foam 176 provides the high compressive and shear strength characteristics of a honeycomb with the insulation properties and bonding surface area of closed-cell foam. This construction tends to be of a higher density than foams alone. A typical construction for this application might be a phenolic paper/cloth honeycomb with cells filled with phenolic foam.

The skins 174 may be formed of fibers embedded in a resin that binds the fibers together. Suitable fibers may include fiberglass, basalt/mineral fibers, aramid cloth, mat and non-wovens (known as Nomex, Kevlar, Technora and others), carbon fibers, ceramic fibers or quartz fibers.

By way of example, the fibers can be laid up in a unidirectional pattern, can be woven, knit or formed as a non-woven web. Bulk properties are then generated by the number of layers and the fiber angle of each layer compared to the other layers. The thickness of the skin 174 can be discretely changed by varying the number of layers, or by the thickness of each individual layer, or by a combination of both. All layers can be of the same fiber material or can be of different fiber blends.

The resin is used to bind the fibers together to form the rigid skins 174. The resin may include phenolic, polyimides including bismaleamides, epoxies, polyesters, and vinyl esters. The resin may also include polyphenylene sulfide and similar sulfides, polyether imide, polyamide imide, and polyetheretherketone.

Figure 10:
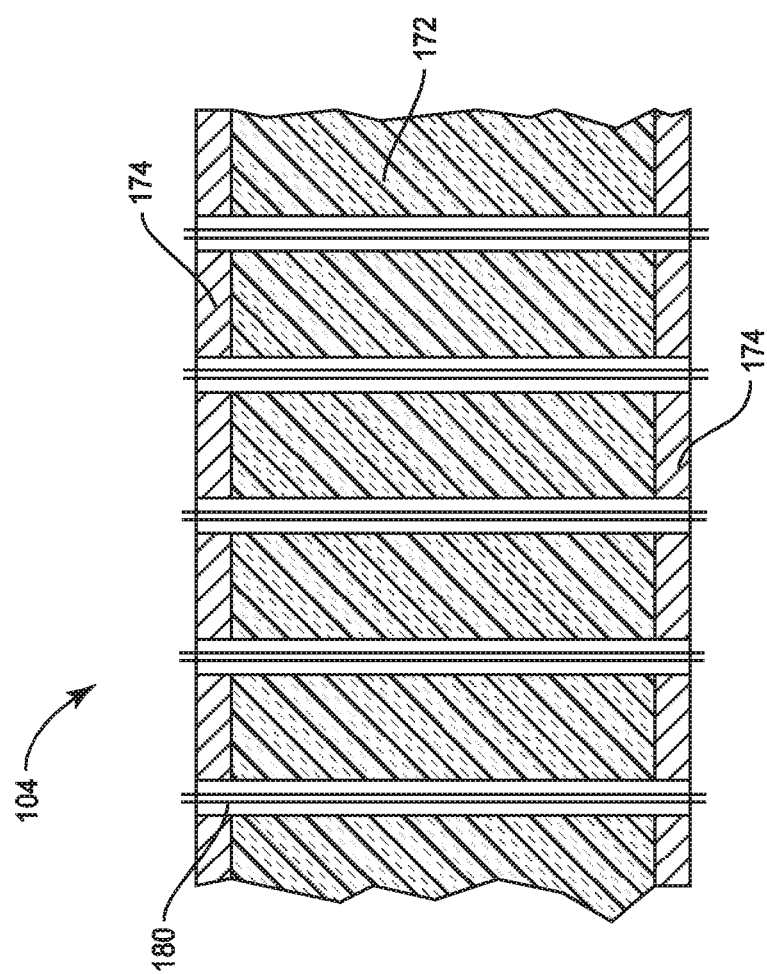
FIG. 10 shows a cross section of a suitable panel for the air cargo container of FIG. 1.

The skins 174 and core 172 may be secured or attached together in various ways. For example, the skins 174 may be adhered to the core 172 by the resin. In another example seen in FIG. 10, Z-axis fibers 180 are inserted through the skins 174 and the core 172. This approach of a reinforced composite is illustrated in at least U.S. Pat. No. 8,002,919. The Z-axis fibers 180 are impregnated with resin during the manufacturing process. The Z-axis fibers 180 serve to prevent delamination.

Turning to FIGS. 11-14, various alternative configurations of containers and fabric closures are shown that may include curtains having the layers described with respect to FIG. 2. In other words, curtains having a structure as discussed with respect to the layers of FIG. 2, may be created to match any of the additional embodiments shown in FIGS. 10-13 and others known to other of ordinary skill in the art.

Figure 11:
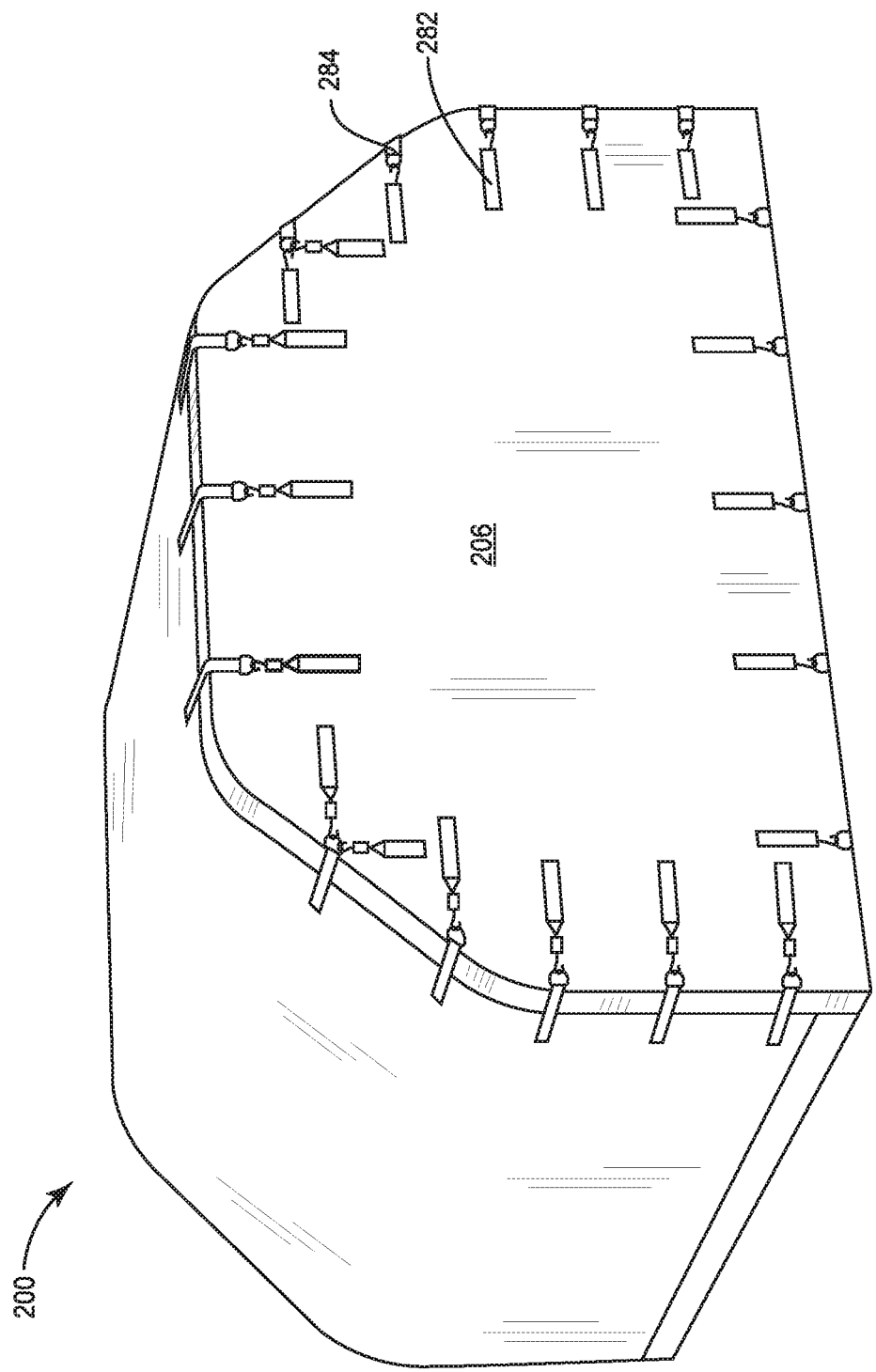
FIGS. 11-14 show containers and curtain closures of alternative shape and accessibility.

FIG. 11 shows a container 200 of an alternative configuration with a curtain 206 sized to completely cover the open end thereof and to overlap the side and top edges thereof. The edge portion may be configured to provide an additional barrier to environmental or other anticipated undesirable elements as described in U.S. Pat. No. 6,755,232. The curtain 206 is shown as a unitary construction without the vertical openings or slide fasteners used in the curtain of FIG. 1.

A plurality of opposed web straps 282 may be attached to the top and bottom portions of the curtain 206. Similarly, opposed web straps may be attached to opposing side portions of the curtain. The web straps 282 may be formed from nylon, but other high strength webbing materials may be substituted. The term "high strength webbing" material means webbing having a tear strength of about 400 pounds or more per linear inch of webbing width. The web straps may be sewn to the curtain 206 with high strength threads such as SPECTRA®, or DYNEEMA®, available from DSM.

A variety of fasteners 284 are commercially available for attachment to the web straps 282. The choice of fasteners may be dependent upon the specific container, government regulations regarding transportation of specific containers, and the particular application.

Figure 12:
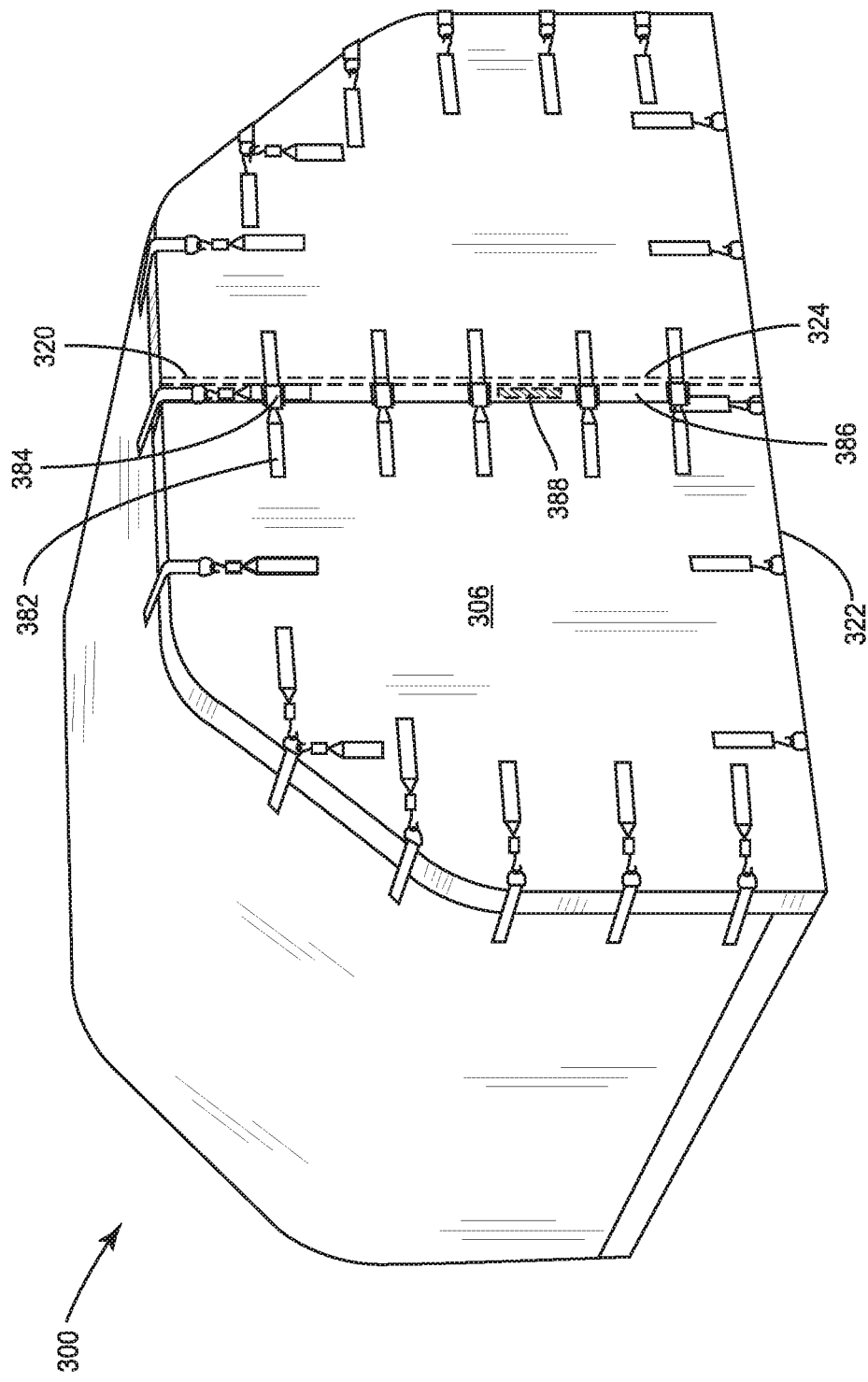

FIG. 12 shows a container 300 with a curtain 306 with a substantially vertical opening 320 extending substantially the height of the curtain. The vertical opening 320 separates the curtain in two portions. The vertical opening 320 may be secured by both web straps 382 and fasteners 384 as well as a slide fastener (i.e. a zipper) 324. As will be appreciated, the slide fastener 324 that is attached along the vertical opening 320 separates from the bottom edge 322 of the curtain 306 upwardly, and interlocks from the top edge of the vertical opening 320 downwardly. Suitable slide fasteners 324 should be at least about 10 gauge, as "gauge" is commonly measured in the art, to provide the heavy-duty load restraint needed.

Optionally, to protect the slide fastener 324 from contamination and exposure from the elements, a flap 386 may be affixed to the curtain 306 by sewing, adhering, etc. to extend along the length of the vertical opening 320, the flap 386 has one edge permanently attached to the curtain 306 and an opposed free edge overlying the slide fastener 324. To further protect the slide fastener 324 from contaminants and environmental exposure, the flap 386 may be secured down with a hook and look fastener 388, such as VEL-CRO®.

In some embodiment, the slide fastener 324 may present a location on the curtain 306 that is most susceptible to conductive heat transfer because of the slide fastener's materials and requirement to form a thin spot in the thickness of the curtain 306. The flap 386 may increase insulation at this location. In other embodiments, a flap may be placed along the inside of the curtain 306 instead of or in addition to the flap 386. The flap 386 may be constructed from one or more the of same layers as the curtain 306. For insulation purposes, the flap 386 should include the insulating layer 110.

Figure 13:
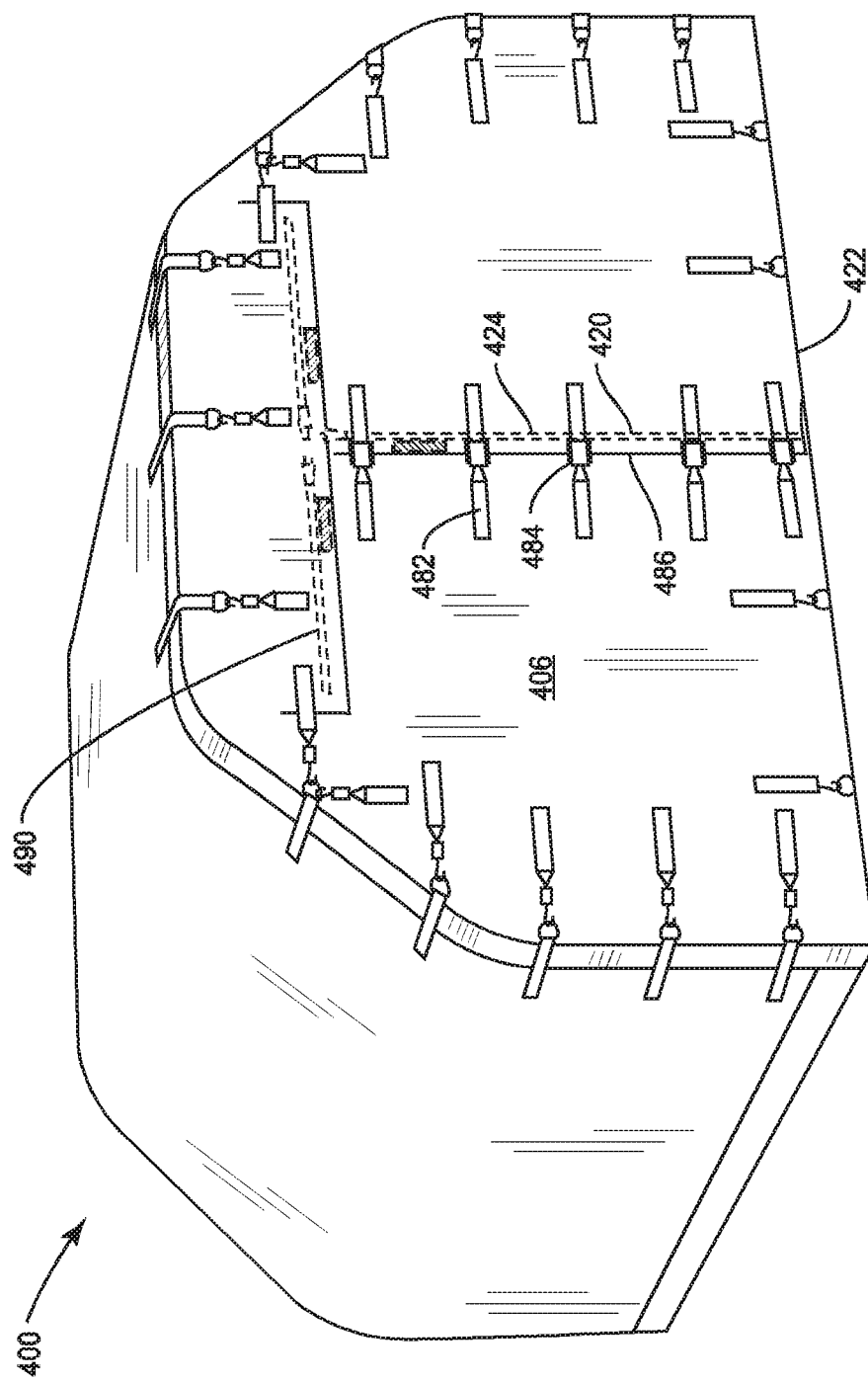

Turning now to FIG. 13, a curtain 406 is shown with a selectively closeable access opening formed in a T-shape with a substantially vertical opening 420, having a length extending from the bottom edge 422 of the curtain 406 to a point spaced apart from the top edge thereof, and a substantially horizontal opening 490 having two horizontal portions that each extend from a point spaced from an opposed side edge of the curtain toward the center thereof to intersect at the upper edge of the vertical opening 420. A slide fastener 424 may be attached along each opening. As will be appreciated, the slide fastener that is attached along the vertical opening 420 separates from the bottom edge upwardly. The other slide fasteners separate from the intersection with vertical opening outwardly toward the opposed side edges of the curtain. The curtain 406 may include web straps 482, fasteners 484 and flaps 486 similar to the curtain 306 shown in FIG. 12.

Figure 14:
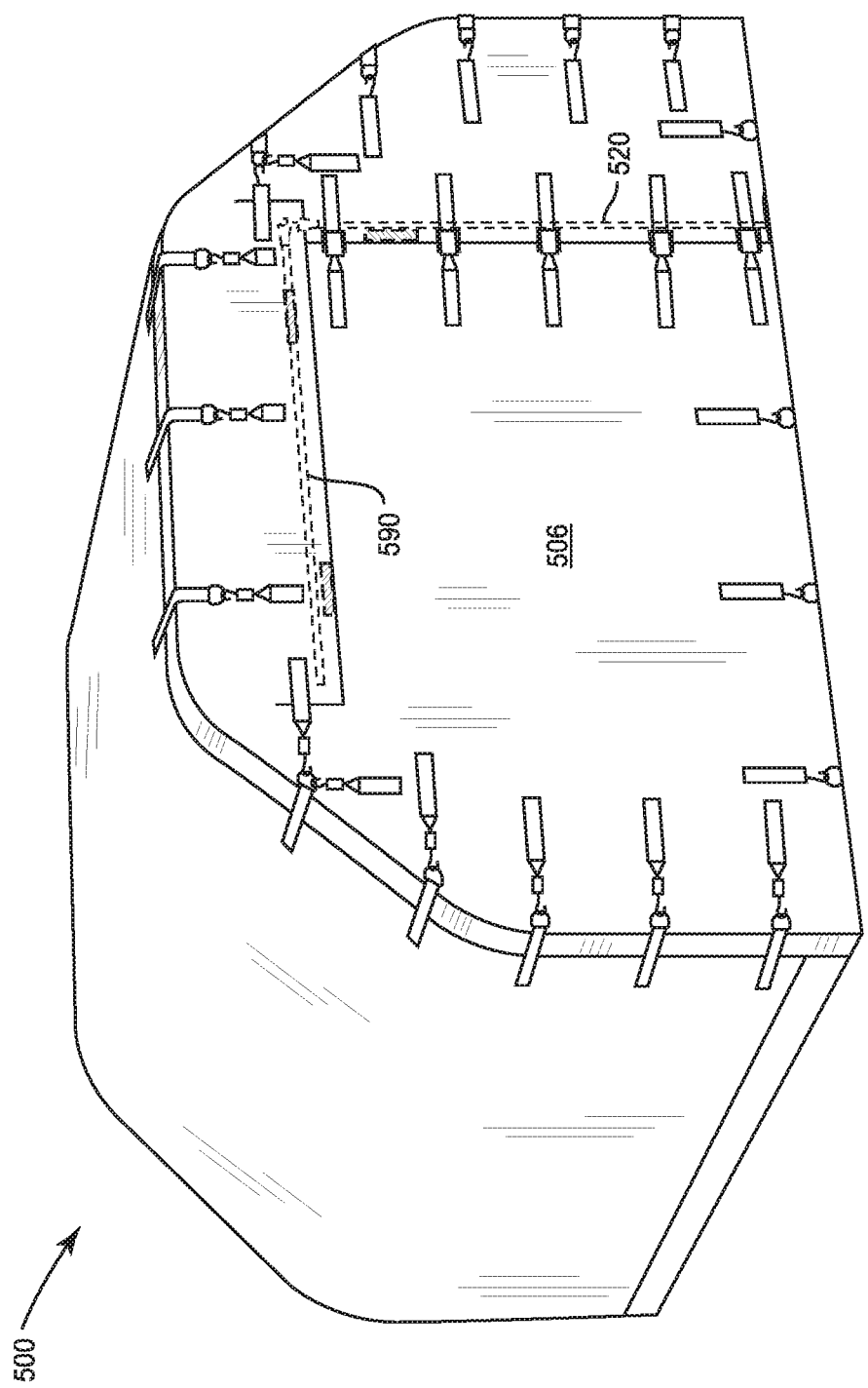

Yet another embodiment, a curtain 506 is shown in FIG. 14 that is substantially similar to the curtain 406 of FIG. 13, but with a vertical opening 520 and a horizontal opening 590 forming an L-shape.

Although the above disclosure has been presented in the context of exemplary embodiments, it is to be understood that modifications and variations may be utilized without departing from the spirit and scope of the invention, as those skilled in the art will readily understand. Such modifications and variations are considered to be within the purview and scope of the appended claims and their equivalents.

What is claimed is:

1. A curtain closure for a cargo opening of an air cargo container, said curtain closure comprising:
   a coated exterior fabric layer rendering the curtain closure substantially waterproof;
   a reinforcing layer comprising an uncoated fabric layer consisting essentially of fibers having a tenacity greater than about 20 grams/denier; and
   a thermal insulating layer to help maintain an internal temperature of the air cargo container, the thermal insulating layer further comprising a metallized layer for heat reflection on an interior side of the thermal insulating layer.

2. The curtain of claim 1, wherein the exterior fabric layer comprises:
   fibers having a tenacity greater than about 20 grams/denier.

3. The curtain of claim 1, wherein the thermal insulating layer is sewn to an inner surface of the exterior fabric layer.

4. The curtain of claim 1, further comprising an inner fabric layer, wherein the thermal insulating layer is provided in segments such that the curtain comprises a plurality of relatively rigid segments having a portion of the thermal insulating layer disposed between the inner fabric layer and the exterior fabric layer, the plurality of relatively rigid segments separated by flexible hinge portions comprising at least the inner fabric layer and the exterior fabric layer.

5. The curtain of claim 1, further comprising vent holes and a cover provided over the vent holes.

6. The curtain of claim 1, wherein the reinforcing layer is sewn to the exterior fabric layer.

7. The curtain of claim 1, wherein the thermal insulating layer incudes air configured to provide insulation.

8. The curtain of claim 1 further comprising at least one vertical opening selectively closeable by a slide fastener.

9. The curtain of claim 8 wherein a tape of the slide fastener is made from an uncoated fabric layer consisting essentially of fibers having a tenacity greater than about 20 grams/denier.

10. The curtain of claim 8 wherein a tape of the slide fastener is made from a fire-resistant material selected from the group consisting of basalt, carbon, and fiberglass.

11. The curtain of claim 8, wherein the curtain further comprises a lock to maintain the slide fastener and the curtain in a closed position.

12. An air cargo container, comprising:
   a frame;
   a plurality of walls, wherein the walls comprise wall panels, each panel comprising an insulating foam core sandwiched between a pair of skins; and
   a selectively openable curtain closure according to claim 1, positioned to substantially seal the cargo opening when the curtain closure is in a closed position.

13. The air cargo container of claim 12, wherein the curtain further comprises vent holes and a cover provided over the vent holes.

14. The air cargo container of claim 12, wherein the curtain further comprises at least one vertical opening selectively closeable by a slide fastener.

15. The air cargo container of claim 14, wherein a tape of the slide fastener is made from an uncoated fabric layer consisting essentially of fibers having a tenacity greater than about 20 grams/denier.

16. The air cargo container of claim 14 wherein a tape of the slide fastener is made from a fire-resistant material selected from the group consisting of basalt, carbon, and fiberglass.

17. The air cargo container of claim 14, wherein the curtain further comprises a lock to maintain the slide fastener and the curtain in a closed position.

18. A curtain closure for a cargo opening of an air cargo container, said curtain closure comprising:
   a coated exterior fabric layer rendering the curtain closure substantially waterproof;
   a reinforcing layer comprising an uncoated fabric layer consisting essentially of fibers having a tenacity greater than about 20 grams/denier; and
   a thermal insulating layer to help maintain an internal temperature of the air cargo container, wherein the thermal insulating layer comprises a bubble film.

19. A curtain closure comprising:
   a substantially waterproof coated fabric layer;
   a reinforcing layer comprising an uncoated fabric layer including fibers having a tenacity greater than 20 grams/denier; and
   a thermal insulating layer configured to thermally insulate one side of the curtain closure from the other side of the curtain closure, the thermal insulating layer selected from the group consisting of: bubble film, aerogels, flexible polymer foams, and elastomeric films.

* * * * *